(12) United States Patent
Fuwa

(10) Patent No.: US 8,160,794 B2
(45) Date of Patent: Apr. 17, 2012

(54) INVERTED WHEEL TYPE MOVING BODY AND METHOD OF CONTROLLING THE SAME

(75) Inventor: Toshio Fuwa, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 308 days.

(21) Appl. No.: 12/668,284

(22) PCT Filed: Jun. 24, 2008

(86) PCT No.: PCT/JP2008/061931
§ 371 (c)(1),
(2), (4) Date: Jan. 8, 2010

(87) PCT Pub. No.: WO2009/008292
PCT Pub. Date: Jan. 15, 2009

(65) Prior Publication Data
US 2011/0010066 A1    Jan. 13, 2011

(30) Foreign Application Priority Data
Jul. 9, 2007 (JP) .................................. 2007-179992

(51) Int. Cl.
*G06F 7/70* (2006.01)
(52) U.S. Cl. .......................................... 701/70; 180/7.1
(58) Field of Classification Search .................... 701/70; 180/7.1
See application file for complete search history.

(56) References Cited

U.S. PATENT DOCUMENTS

| | | | | |
|---|---|---|---|---|
| 7,635,041 B2 * | 12/2009 | Adachi | .......................... | 180/218 |
| 7,658,245 B2 * | 2/2010 | Nakamura et al. | ............. | 180/8.3 |
| 7,677,345 B2 * | 3/2010 | Hosoda | .......................... | 180/218 |
| 7,779,939 B2 * | 8/2010 | Kamen et al. | .................. | 180/7.1 |
| 2004/0149499 A1 * | 8/2004 | Kim | ................................ | 180/8.2 |
| 2005/0238337 A1 * | 10/2005 | Kidd et al. | ..................... | 388/838 |

FOREIGN PATENT DOCUMENTS

| | | |
|---|---|---|
| JP | 63 305082 | 12/1988 |
| JP | 2000 514680 | 11/2000 |
| JP | 2006 1384 | 1/2006 |
| JP | 2006 1385 | 1/2006 |
| JP | 2007 11634 | 1/2007 |
| JP | 2007 168603 | 7/2007 |
| WO | 99 22966 | 5/1999 |

* cited by examiner

*Primary Examiner* — Hussein A. Elchanti
(74) *Attorney, Agent, or Firm* — Oblon, Spivak, McClelland, Maier & Neustadt, L.L.P.

(57) ABSTRACT

An inverted wheel type moving body that can enhance convenience and a method of controlling the same. The inverted wheel type moving body includes a right chassis and a left chassis rotationally supporting a right driving wheel and a left driving wheel, motors rotationally driving the right driving wheel and the left driving wheel, a body rotatably supported on the right chassis and the left chassis through a right arm and a left arm, a pressure-sensitive sensor provided to judge whether a transportation object dismounts, and a control unit controlling the motors to reduce velocity upon judgment that the transportation object dismounts based on the output from the pressure-sensitive sensor when the moving body travels faster than a certain velocity, in which overturn preventing operation is executed after an absolute value of the velocity is lower than a threshold value.

20 Claims, 9 Drawing Sheets

MOVING DIRECTION ←

INVERTED WHEEL TYPE MOVING BODY AND METHOD OF CONTROLLING THE SAME

TECHNICAL FIELD

The present invention relates to an inverted wheel type moving body and a method of controlling the same.

BACKGROUND ART

An inverted wheel type moving body is typically controlled to travel in such a manner that the position of the center of mass of the body is constantly corrected to maintain the stable state by driving right and left driving wheels. By mounting a transportation object such as a person or an inanimate object on the moving body, transportation can be made in a simple way. In such a moving body, sudden stop or sudden acceleration may cause overturn of the moving body. A moving body equipped with sub wheels in order to prevent such an overturn during the travelling is disclosed (patent document 1).

For example, according to a vehicle in the patent document 1, sub wheels are arranged in a front-back direction of drive wheels. The sub wheels are provided in end parts of struts extended and retracted by actuators. An inclination is detected by a detector that detects a moment. According to the inclination that is detected, the strut is deployed by the actuator to bring the sub wheel contact with the ground.

[Patent Document 1] Published Japanese Translation of PCT International Publication for Patent Application, No. 2000-514680

DISCLOSURE OF INVENTION

Technical Problem

Such an inverted wheel type moving body is a vehicle that is assumed to be prevalent in people's lives. Thus, if it provides high ride quality, a passenger may consider that it is similar to a normal vehicle like a wheelchair. As such, a passenger may forget that the moving body keeps an inverted state while performing feedback control. When the passenger accidentally puts his/her feet on the ground, the inverted wheel type moving body is inclined in the forward direction due to the movement of the center of mass by the passenger. In such a case, the moving body makes the inclined angle back to its original angle for keeping the inverted state. Thus, the moving body accelerates in the forward direction and moves forward. As a result, the vehicle may hit the feet that are put on the ground. The similar problem occurs not only when the passenger mounts the moving body but also when the transportation object is an inanimate object. In short, as the moving body is inclined in the forward direction when the transportation object is dismounted from the moving body, the moving body moves forward.

Although it may be possible to deal with such a problem by requiring manufacturers to equip the moving body with a seat belt and requiring the passenger to wear his/her seat belt, it may be out of the vehicle concept that it is assumed to be prevalent in people's lives. Further, if special skills are required for the passenger to prevent the moving in abrupt dismount, usability as a vehicle will be reduced. As such, according to the related inverted wheel type moving body, it is difficult to enhance convenience in dismounting.

The present invention has been made in order to solve such a problem, and aims to provide an inverted wheel type moving body which is capable of enhancing convenience and a method of controlling the same.

Technical Solution

An inverted wheel type moving body according to a first aspect of the present invention is a moving body that moves in accordance with command input according to manipulation by a manipulator and transports a transportation object, the inverted wheel type moving body including a chassis rotationally supporting a wheel, a first drive unit rotationally driving the wheel, a body provided to mount the transportation object and rotatably supported on the chassis through a support member, a sensor provided to judge whether the transportation object dismounts from the body, output of the sensor varying depending on states of the transportation object on the body, a second drive unit performing overturn preventing operation, and a control unit controlling the first drive unit to reduce velocity of the inverted wheel type moving body upon judgment that the transportation object dismounts based on the output from the sensor when the inverted wheel type moving body travels faster than a certain velocity, in which the control unit controls the second drive unit to perform the overturn preventing operation after an absolute value of velocity of the inverted wheel type moving body is lower than a threshold value when it is judged that the transportation object dismounts. Accordingly, the overturn preventing operation is executed after the velocity is reduced, which enhances safety. Thus, this moving body can be applied in various places, which enhances convenience.

An inverted wheel type moving body according to a second aspect of the present invention is the above-described inverted wheel type moving body, in which, the control unit judges that the transportation object dismounts based on the output from the sensor and the command input and controls the second drive unit to execute the overturn preventing operation when the inverted wheel type moving body travels at or less than the certain velocity. Accordingly, it is possible to prevent the false judgment that the object dismounts, whereby it is possible to prevent the overturn preventing operation from being executed when it is not desired. Thus, convenience can be enhanced.

An inverted wheel type moving body according to a third aspect of the present invention is a moving body that moves in accordance with command input according to manipulation by a manipulator and transports a transportation object, the inverted wheel type moving body including a chassis rotationally supporting a wheel, a first drive unit rotationally driving the wheel, a body provided to mount the transportation object and rotatably supported on the chassis through a support member, a sensor provided to judge whether the transportation object dismounts from the body, output of the sensor varying depending on states of the transportation object on the body, a second drive unit performing overturn preventing operation, and a control unit judging that the transportation object dismounts based on the output from the sensor and the command input and controlling the second drive unit to execute the overturn preventing operation when the inverted wheel type moving body travels at or less than the certain velocity. Accordingly, it is possible to prevent the false judgment that the object dismounts, whereby it is possible to prevent the overturn preventing operation from being executed when it is not desired. Thus, convenience can be enhanced.

An inverted wheel type moving body according to a fourth aspect of the present invention is the above-described inverted wheel type moving body, in which upon judgment that the transportation object dismounts, the inverted wheel type moving body sets a target inclination angle that allows the body to incline in a direction opposite to moving direction, and the control unit feedback controls the first drive unit in accordance with the target inclination angle. Accordingly, the velocity can be promptly reduced.

An inverted wheel type moving body according to a fifth aspect of the present invention is the above-described inverted wheel type moving body, in which upon judgment that the transportation object dismounts, the inverted wheel type moving body sets a torque command that allows the body to incline in a direction opposite to moving direction, and the first drive unit rotationally drives the wheel based on the torque command. Accordingly, the velocity can be promptly reduced.

An inverted wheel type moving body according to a sixth aspect of the present invention is the above-described inverted wheel type moving body, in which the inverted wheel type moving body sets drive torque of the wheel to 0 after starting the overturn preventing operation. Accordingly, safe dismount can be realized.

An inverted wheel type moving body according to a seventh aspect of the present invention is the above-described inverted wheel type moving body, in which the inverted wheel type moving body executes the overturn preventing operation by lowering position of center of mass of the body or deploying an overturn preventing member in a forward side of the body. Accordingly, it is possible to definitely prevent overturn.

According to an eighth aspect of the present invention, there is provided a method of controlling an inverted wheel type moving body, the inverted wheel type moving body including a chassis rotationally supporting a wheel, a first drive unit rotationally driving the wheel, a body provided to mount the transportation object and rotatably supported on the chassis through a support member, a sensor provided to judge whether the transportation object dismounts from the body, output of the sensor varying depending on states of the transportation object on the body, and a second drive unit performing overturn preventing operation, the method including a step of judging whether the inverted wheel type moving body travels faster than a certain velocity, a step of judging whether the transportation object dismounts based on the output from the sensor when the body travels faster than the certain velocity, a step of reducing velocity of the inverted wheel type moving body upon judgment that the transportation object dismounts, and a step of controlling the second drive unit to execute the overturn preventing operation after an absolute value of velocity of the inverted wheel type moving body is lower than a threshold value. Accordingly, the overturn preventing operation is executed after the velocity is reduced, which enhances safety. Thus, this moving body can be applied in various places, which enhances convenience.

A method of controlling an inverted wheel type moving body according to a ninth aspect of the present invention is the above-described method, further including steps of judging that the transportation object dismounts based on the output from the sensor and the command input and controlling the second drive unit to operate the overturn preventing operation when the inverted wheel type moving body travels at or less than the certain velocity. Accordingly, it is possible to prevent the false judgment that the object dismounts, whereby it is possible to prevent the overturn preventing operation from being executed when it is not desired. Thus, convenience can be enhanced.

According to a tenth aspect of the present invention, there is provided a method of controlling an inverted wheel type moving body, the inverted wheel type moving body including a chassis rotationally supporting a wheel, a first drive unit rotationally driving the wheel, a body provided to mount the transportation object and rotatably supported on the chassis through a support member, a sensor provided to judge whether the transportation object dismounts from the body, output of the sensor varying depending on states of the transportation object on the body, and a second drive unit performing overturn preventing operation, the inverted wheel type moving body moving in accordance with command input according to manipulation by a manipulator and transporting a transportation object, the method including a step of judging whether the inverted wheel type moving body travels faster than a certain velocity, and steps of judging that the transportation object dismounts based on the output from the sensor and the command input and controlling the second drive unit to execute the overturn preventing operation when the inverted wheel type moving body travels at or less than the certain velocity. Accordingly, it is possible to prevent the false judgment that the object dismounts, whereby it is possible to prevent the overturn preventing operation from being executed when it is not desired. Thus, convenience can be enhanced.

A method of controlling an inverted wheel type moving body according to an eleventh aspect of the present invention is the above-described method, including upon judgment that the transportation object dismounts, setting a target inclination angle that allows the body to incline in a direction opposite to moving direction, and feedback controlling the first drive unit in accordance with the target inclination angle. Accordingly, the velocity can be promptly reduced.

A method of controlling an inverted wheel type moving body according to a twelfth aspect of the present invention is the above-described method, including upon judgment that the transportation object dismounts, setting a torque command that allows the body to incline in a direction opposite to moving direction, and rotationally driving the wheel by the first drive unit based on the torque command. Accordingly, the velocity can be promptly reduced.

A method of controlling an inverted wheel type moving body according to a thirteenth aspect of the present invention is the above-described method, including setting drive torque of the wheel to 0 after starting the overturn preventing operation. Accordingly, safe dismount can be realized.

A method of controlling an inverted wheel type moving body according to a fourteenth aspect of the present invention is the above-described method, including executing the overturn preventing operation by lowering position of center of mass of the body or deploying an overturn preventing member in a forward side of the body. Accordingly, overturn can be definitely prevented.

Advantageous Effects

According to the present invention, it is an object to provide an inverted wheel type moving body which is capable of enhancing convenience and a method of controlling the same.

EXPLANATION OF REFERENCE

12 BODY
14 RIGHT ARM
16 LEFT ARM
17 RIGHT CHASSIS
18 RIGHT DRIVING WHEEL
19 LEFT CHASSIS
20 LEFT DRIVING WHEEL
22 PASSENGER SEAT
26 RIGHT MOUNT
28 LEFT MOUNT
30 AXLE
32 AXLE
34 RIGHT WHEEL DRIVE MOTOR
36 LEFT WHEEL DRIVE MOTOR
41 FOOTREST
42 PRESSURE-SENSITIVE SENSOR
43 SHIELD SENSOR
44 BATTERY MODULE
45 PRESSURE-SENSITIVE SENSOR
46 MANIPULATION MODULE
47 PASSENGER
48 GYRO-SENSOR
52 RIGHT WHEEL ENCODER
54 LEFT WHEEL ENCODER
61 UPPER JOINT
62 UPPER LINK
63 LOWER JOINT
64 LOWER LINK
65 LOWER JOINT MOTOR
66 UPPER JOINT MOTOR
70 PEDESTAL
72 COLUMN
80 CONTROL UNIT
81 TRAVEL CONTROL MODULE
82 POSTURE CONTROL MODULE
85 JUDGMENT UNIT
91 UPPER JOINT
92 UPPER LINK
93 LOWER JOINT
94 LOWER LINK
95 LOWER JOINT MOTOR
96 UPPER JOINT MOTOR
100 MOVING BODY

BEST MODE FOR CARRYING OUT THE INVENTION

A moving body according to the present embodiment is an inverted wheel type moving body that travels by the inverted pendulum control. The moving body travels to the desired place by driving wheels that contact with the ground. Thus, a transportation object that mounts on the body can be transported. In addition, the moving body can be maintained at an inverted state by driving the wheels in response to an output from a gyro-sensor or the like. Further, the moving body is provided with a sensor to judge whether the transportation object is dismounted or not.

First Embodiment

Figure 1:
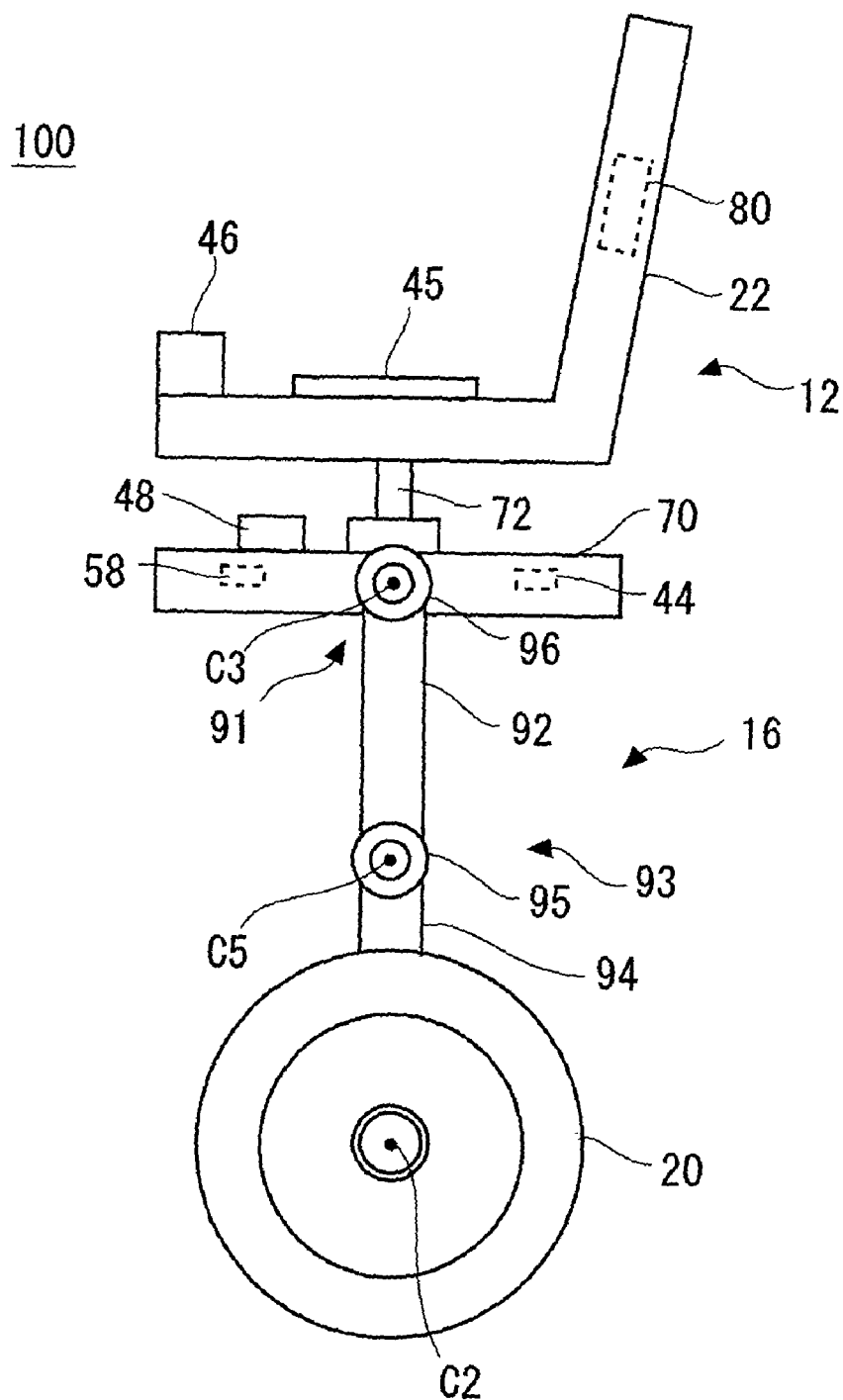
FIG. 1 A side view showing the structure of a moving body according to an embodiment of the present invention.
Figure 2:
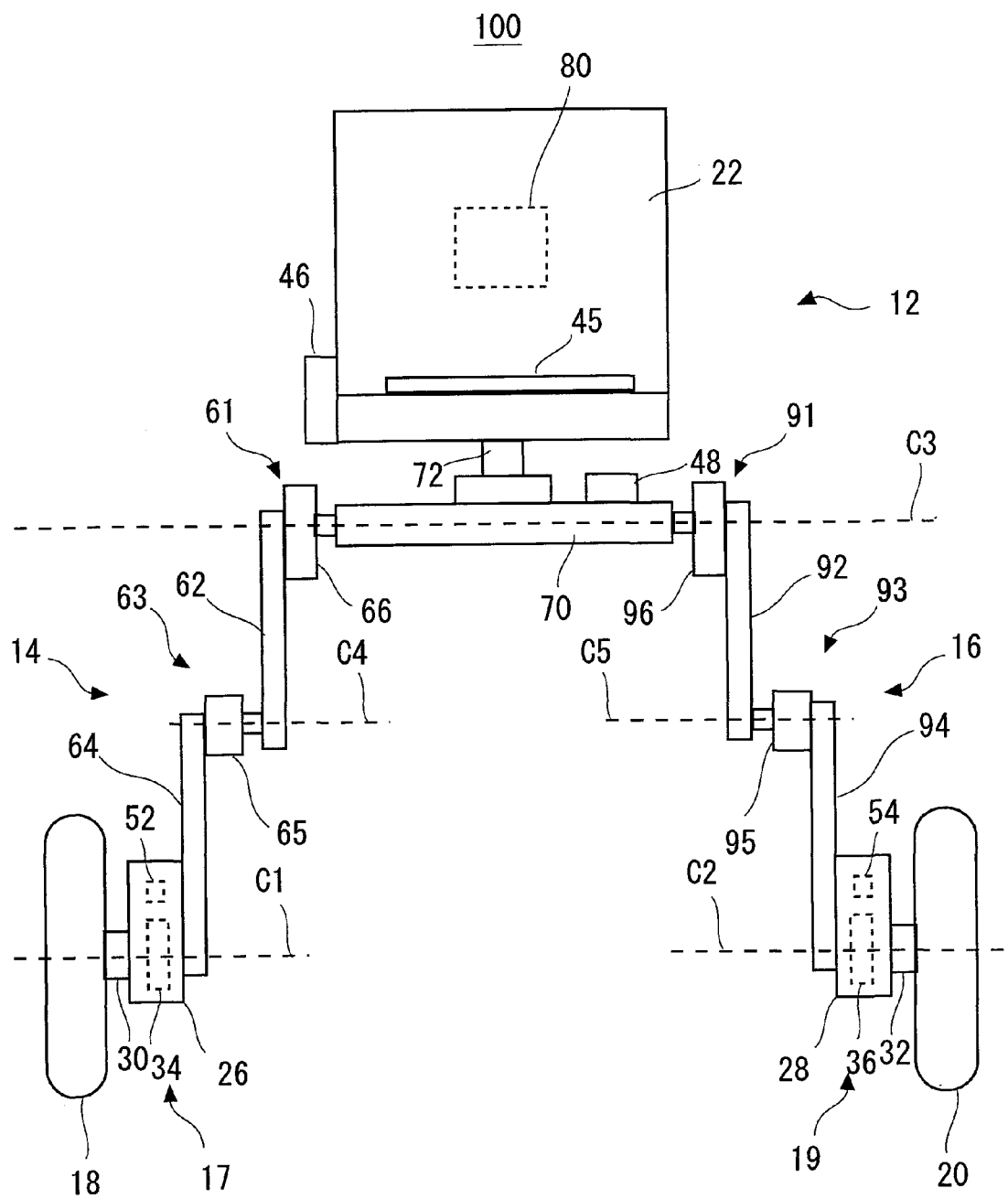
FIG. 2 A front view showing the structure of the moving body according to the embodiment of the present invention.

Referring to FIGS. 1 and 2, the structure of a moving body 100 according to the present embodiment will be described. FIG. 1 is a side view schematically showing the structure of the moving body 100, and FIG. 2 is a front view schematically showing the structure of the moving body 100.

As shown in FIG. 2, the moving body 100 is an inverted wheel type moving body (travelling body), and includes a right driving wheel 18, a left driving wheel 20, a right chassis 17, a left chassis 19, a right arm 14, a left arm 16, and a body 12. The body 12 is an upper body unit of the moving body 100 disposed above the right driving wheel 18 and the left driving wheel 20. Here, the travelling direction of the moving body 100 (direction perpendicular to the paper in which FIG. 2 is drawn) is referred to as front-back direction, and a direction perpendicular to the front-back direction in the horizontal plane is referred to as lateral direction (transverse direction). Thus, FIG. 1 is a diagram of the moving body 100 when seen from the front side in the travelling direction, and FIG. 2 is a diagram of the moving body 100 when seen from the left side.

The right arm 14 and the left arm 16 are swing arms including joints. When the moving body travels normally, the right arm 14 and the left arm 16 are extended, as shown in FIG. 2. Further, the right arm 14 and the left arm 16 are driven in accordance with the inclination angle of the body 12. Specifically, when the body 12 is inclined in the lateral direction in accordance with the inclination angle of the ground, one of the arms is driven to level the body 12. For example, assume a situation in which only the right driving wheel 18 runs on a step while the moving body is travelling on the level ground, or a situation in which the moving body is travelling from the level ground to the inclined ground where the right side is higher than the left side. In this case, the height with respect to the horizontal direction varies between the right driving wheel 18 and the left driving wheel 20. In summary, the right driving wheel 18 becomes higher than the left driving wheel 20. In this case, the right arm 14 is shortened to adjust the inclination angle of the body 12. For example, the joint of the right arm 14 is driven to bend the right arm 14 into a dog leg shape. Thus, the right arm 14 becomes shorter, and the body 12 can be horizontal in the transverse direction (lateral direction). Further, the right arm 14 and the left arm 16 perform overturn preventing operation when a passenger dismounts. Note that the structure of the right arm 14 and the left arm 16 will be described later.

On the side surface side of the right chassis 17, the right driving wheel 18 that contacts with the ground is provided. On the side surface side of the left chassis 19, the left driving wheel 20 that contacts with the ground is provided. The right driving wheel 18 and the left driving wheel 20 are a pair of wheels that rotate on the same axis. The moving body 100 moves by the rotation of the right driving wheel 18 and the left driving wheel 20 that contact with the ground.

Between the right driving wheel 18 and the right arm 14, the right chassis 17 is disposed. The right chassis 17 includes a right mount 26. Between the right arm 14 and the right driving wheel 18, the right mount 26 is disposed. The right mount 26 is fixed to the side end of the right arm 14. The right chassis 17 rotationally supports the right driving wheel 18 through an axle 30. The right driving wheel 18 is fixed to a rotation axis C1 of a right wheel drive motor 34 through the axle 30. The right wheel drive motor 34 is fixed into the right mount 26, and functions as a drive unit (actuator) for the wheel. In short, the right wheel drive motor 34 rotationally drives the right driving wheel 18.

Between the left driving wheel 20 and the left arm 16, the left chassis 19 is disposed. The left chassis 19 includes a left mount 28. Between the left arm 16 and the left driving wheel 20, the left mount 28 is disposed. The left mount 28 is fixed to the side end of the left arm 16. The left mount 28 rotationally supports the left driving wheel 20 through an axle 32. The left driving wheel 20 is fixed to a rotation axis C2 of a left wheel drive motor 36 through the axle 32. The left wheel drive motor 36 is fixed into the left mount 28, and functions as a drive unit (actuator) for the wheel. In short, the left wheel drive motor 36 rotationally drives the left driving wheel 20. Between the right driving wheel 18 and the left driving wheel 20, the right chassis 17 and the left chassis 19 are disposed. The right chassis 17 may be fixed to the left chassis 19 in order to dispose the right driving wheel 18 and the left driving wheel 20 on the same axis.

The right wheel drive motor 34 and the left wheel drive motor 36 are, for example, servomotors. The actuators for the wheels are not limited to electrical motors, and actuators using air pressure or oil pressure may also be used.

The right mount 26 further includes a right wheel encoder 52. The right wheel encoder 52 detects the rotation angle of the right driving wheel 18 as the rotation amount of the right driving wheel 18. The left mount 28 includes a left wheel encoder 54. The left wheel encoder 54 detects the rotation angle of the left driving wheel 20 as the rotation amount of the left driving wheel 20.

The left arm 16 is mounted to the side end of the left driving wheel 20 through the left mount 28. The left arm 16 includes an upper joint 91, an upper link 92, a lower joint 93, and a lower link 94. The upper link 92 and the lower link 94 are rod-shaped members. The upper link 92 and the lower link 94 are rigid bodies having substantially the same length. The upper joint 91 and the lower joint 93 are rotary joints.

The lower link 94 is connected to the left mount 28. In short, the left mount 28 is mounted to the lower end of the lower link 94. The left mount 28 rotatably supports the lower link 94. Further, the lower joint 93 is disposed to the lower link 94. The lower link 94 is connected to the upper link 92 through the lower joint 93. In summary, the lower joint 93 disposed to the upper end of the lower link 94 is disposed to the lower end of the upper link 92.

The lower joint 93 includes a lower joint motor 95. When the lower joint motor 95 is driven, the upper link 92 rotates. When the lower joint motor 95 is driven, the angle of the upper link 92 with respect to the lower link 94 varies. As will be shown, the lower joint 93 is disposed in the middle of the left arm 16. In summary, the lower joint 93 is disposed between the upper link 92 and the lower link 94. The upper link 92 is fixed to a rotation axis C5 of the lower joint motor 95.

The upper joint 91 is provided in the upper end of the upper link 92. The upper joint 91 connects the upper link 92 and the body 12. The left arm 16 is connected to the body 12 through the upper joint 91. As stated, the upper joint 91 is provided in the upper end of the left arm 16. Further, the upper joint 91 includes an upper joint motor 96. The body 12 is mounted to the left arm 16 through the upper joint motor 96. When the upper joint motor 96 is driven, the body 12 rotates. In summary, when the upper joint motor 96 is driven, the angle of the body 12 with respect to the upper link 92 varies. The body 12 is fixed to a rotation axis C3 of the upper joint motor 96.

When the upper joint 91 and the lower joint 93 are driven, the posture of the body 12 varies. In summary, the left arm 16 is a link mechanism that connects the body 12 with the left driving wheel 20. Thus, the lower end side of the left arm 16 is connected to the rotation axis C2 of the left driving wheel 20, and the upper end side thereof is connected to the rotation axis C3 of the body 12. The left arm 16 functions as an arm mechanism of two degree of freedom including two rotary joints. In summary, the left arm 16 functions as an arm mechanism including a plurality of joints, and connects the body 12 with the right chassis 17.

The longitudinal direction of the left arm 16 is perpendicular to the rotation axis C2. Thus, the longitudinal direction of the lower link 94 and the rotation axis C2 are perpendicular to each other. When the moving body travels normally, the upper link 92 and the lower link 94 are provided along with the vertical direction. Thus, the rotation angle of the lower joint motor 95 is fixed so that the upper link 92 and the lower link 94 become parallel to each other. The body 12 is rotationally supported with respect to the rotation axis C2 through the left arm 16. The rotation axis C2 and the rotation axis C5 are disposed in parallel with a distance corresponding to the length of the lower link 94. The rotation axis C3 and the rotation axis C5 are disposed in parallel with a distance corresponding to the length of the upper link 92. When the moving body travels normally, the rotation axis C3 is parallel with the rotation axis C5.

The right arm 14 is mounted to the side end of the right driving wheel 18 through the right mount 26. The right arm 14 includes an upper joint 61, an upper link 62, a lower joint 63, and a lower link 64. The upper link 62 is connected to the body 12 through the upper joint 61. Further, the lower link 64 is connected to the right chassis 17. Further, the lower link 64 and the upper link 62 are connected through the lower joint 63. The lower joint 63 includes a lower joint motor 65. The upper joint 61 includes an upper joint motor 66. As stated above, the right arm 14 also functions as an arm mechanism of two degrees of freedom including two joints, as is the same as the left arm 16. As the structure of the right arm 14 is the same as that of the left arm 16, the description will be omitted. Note that the rotation axis of the lower joint motor 65 of the right arm 14 is a rotation axis C4. Further, the upper joint motor 66 rotates about the rotation axis C3.

When the upper joint 61 and the lower joint 63 of the right arm 14 are driven, the posture of the body 12 varies. In summary, the right arm 14 is a link mechanism that connects the body 12 with the right driving wheel 18. Thus, the lower end side of the right arm 14 is connected to the rotation axis C1 of the right driving wheel 18, and the upper end side thereof is connected to the rotation axis C3 of the body 12. The right arm 14 functions as an arm mechanism of two degrees of freedom including two rotary joints. In summary, the right arm 14 functions as an arm mechanism including a plurality of joints, and connects the body 12 with the right chassis 17.

The longitudinal direction of the right arm 14 is perpendicular to the rotation axis C1. Thus, the longitudinal direction of the lower link 64 and the rotation axis C1 are perpendicular to each other. When the moving body travels normally, the upper link 62 and the lower link 64 are arranged on the same axis. In summary, the rotation angle of the lower joint motor 65 is fixed so that the upper link 62 and the lower link 64 are collinearly arranged when seen from the side surface. The body 12 is rotationally supported with respect to the rotation axis C1 through the right arm 14. Further, when the moving body travels normally, the rotation axis C1, the rotation axis C3, and the rotation axis C4 are parallel with one another.

Now, the upper joint motor 66 of the right arm 14 and the upper joint motor 96 of the left arm 16 are arranged along with the vertical direction. In summary, the upper joint motor 66 of the right arm 14 and the upper joint motor 96 of the left arm 16 include a common rotation axis C3. Further, when the moving body travels normally, the lower joint motor 65 of the right arm 14 and the lower joint motor 95 of the left arm 16 are arranged on the same axis. In summary, the rotation axis C4 of the upper joint motor 66 has the same height as that of the rotation axis C5 of the upper joint motor 96.

As stated above, the upper joint motor 66 and the lower joint motor 65 are mounted to the right arm 14, and the upper joint motor 96 and the lower joint motor 95 are mounted to the left arm 16. The upper joint motors 66 and 96 vary the angle of the body 12 with respect to the upper links 62 and 92. The lower joint motor 65 varies the angle of the upper link 62 with respect to the lower link 64, and the lower joint motor 95 varies the angle of the upper link 92 with respect to the lower link 94. In summary, the upper joint motor 66 and the lower joint motor 65 are drive units (actuators) controlling the angle of the joint of the right arm 14. The upper joint motor 96 and the lower joint motor 95 are drive units (actuators) controlling the angle of the joint of the left arm 16. Thus, the position of the body 12 with respect to the right chassis 17 and the left chassis 19 can be varied by driving the right arm 14 and the left arm 16. The upper joint motors 66 and 96 and the lower joint motors 65 and 95 are, for example, servomotors that control the posture angle of the body 12. Note that the kinetic power of the motors may be transmitted through gears, belts, pulleys, and the like. The height of the body 12 is varied by driving each of the motors. Thus, the vehicle height of the moving body 100 can be varied.

When the upper joint motor 66 and the upper joint motor 96 are driven, the angle of the pedestal 70 with respect to the right arm 14 and the left arm 16 varies. Thus, the pedestal 70 can be rotated back and forth with the rotation axis C3 being as a rotation center. The rotation axis C3 is parallel to the rotation axes C1 and C2 and positioned above the rotation axes C1 and C2. The right arm 14 is provided between the rotation axis C3 and the rotation axis C1. The left arm 16 is provided between the rotation axis C3 and the rotation axis C2. The lower joint motor 65 rotates the upper link 62 about the rotation axis C4 with respect to the lower link 64. The lower joint motor 95 rotates the upper link 92 about the rotation axis C5 with respect to the lower link 94. Further, the rotation axis C4 is positioned between the rotation axis C3 and the rotation axis C1, and the rotation axis C5 is positioned between the rotation axis C3 and the rotation axis C2. The upper joint motor 66 and the upper joint motor 96 are provided in the rotation axis C3, and serve as swing arms controlling the posture by the right arm 14 and the left arm 16. Note that, when the moving body travels normally, the rotation axis C1 to the rotation axis C5 are parallel, which means that the axes are horizontal with the lateral direction of the moving body 100.

The body 12 includes a pedestal 70, a column 72, a gyro-sensor 48, and a passenger seat 22. The flat-plate like pedestal 70 is mounted to the right arm 14 and the left arm 16 through the upper joint motor 66 and the upper joint motor 96, respectively. The right arm 14 and the left arm 16 are provided at the opposing side surfaces of the pedestal 70. In short, the pedestal 70 is disposed between the right arm 14 and the left arm 16.

The pedestal 70 contains a battery module 44 and a sensor 58. The sensor 58 is, for example, an optical obstacle detection sensor that outputs a detection signal upon detection of an obstacle in front of the moving body 100. The sensor 58 may include other sensors in place of the obstacle sensor. For example, the sensor 58 may be an acceleration sensor. As a matter of course, two or more sensors may be used as the sensor 58. The sensor 58 detects variations that vary in accordance with the state of the moving body 100. For example, the sensor 58 measures the velocity of the moving body 100 in translational direction. The battery module 44 supplies electrical power to the sensor 58, the gyro-sensor 48, the right wheel drive motor 34, the left wheel drive motor 36, the upper joint motor 66, the upper joint motor 96, the lower joint motor 65, the lower joint motor 95, a control unit 80, and the like.

The gyro-sensor 48 is provided on the pedestal 70 of the body 12. The gyro-sensor 48 detects an angular velocity with respect to the inclination angle of the body 12. In this case, the term "inclination angle of the body 12" means the degree of the inclination of the position of the center of mass of the moving body 100 with respect to the vertical axis extending upwardly from the axles 30 and 32. For example, the inclination angle of the body 12 is defined to be "positive" when the body 12 is inclined forward in the travelling direction of the moving body 100, and defined to be "negative" when the body 12 is inclined backward in the travelling direction of the moving body 100.

Further, in addition to the front-back direction in the travelling direction, an inclination angle velocity in the lateral direction is also measured by using the three-axis (roll, pitch, and yaw) gyro-sensor 48. In this manner, the gyro-sensor 48 measures variations in the inclination angles of the pedestal 70 as the inclination angle velocities of the body 12. As a matter of course, the gyro-sensor 48 may be mounted in other places. The inclination angle velocities measured by the gyro-sensor 48 vary in accordance with variations in the posture of the moving body 100. That is, the inclination angle velocities are variations that vary in accordance with the position of the center of mass of the body 12 with respect to the positions of the axles. Accordingly, when the inclination angles of the body 12 vary abruptly by a disturbance or the like, the inclination angle velocity values become larger. The inclination angle of the body is specified based on the inclination angle velocity detected by the gyro-sensor 48. The inclination angle in the front-back direction as a basis of the vertical direction is called body inclination angle.

The column 72 is provided near the center of the pedestal 70. The column 72 supports the passenger seat 22. That is, the passenger seat 22 is fixed to the pedestal 70 through the column 72. The passenger seat 22 has a chair-like shape on which the passenger can be seated.

A manipulation module 46 is provided on the side surface of the passenger seat 22. A manipulation lever (not shown) and a brake lever (not shown) are provided on the manipulation module 46. The manipulation lever is a manipulation member that is used by the passenger to adjust the travelling velocity and the travelling direction of the moving body 100. The passenger can adjust the travelling velocity of the moving body 100 by adjusting the manipulation amount of the manipulation lever. Further, the passenger can specify the travelling direction of the moving body 100 by adjusting the manipulation direction of the manipulation lever. The moving body 100 can perform forward movements, stops, backward movements, left turns, right turns, left rotations, and right rotations in accordance with manipulations applied to the manipulation lever. The passenger can put a brake on the moving body 100 by tilting the brake lever. The moving body 100 travels in the direction perpendicular to the axles 30 and 32. As the manipulator manipulates the manipulation module 46, command input (input command value) in accordance with the manipulation by the manipulator is input. This command input corresponds to the target velocity or the target accelerations. For example, forward/backward command is input to the control unit 80 by tilting the manipulation lever in the front-back direction.

A pressure-sensitive sensor 45 is provided on the seating surface of the passenger seat 22. A passenger is seated on the pressure-sensitive sensor 45. Thus, the passenger is seated on the passenger seat 22 with contacting with the pressure-sensitive sensor 45. The pressure-sensitive sensor 45 detects the pressure that is applied by the weight of the passenger. The pressure detected by the pressure-sensitive sensor 45 is called seat pressure.

The pressure-sensitive sensor 45 and the gyro-sensor 48 are provided to judge whether the passenger dismounts. For example, when the moving body travels normally, a certain pressure is applied to the pressure-sensitive sensor 45 by the weight of the passenger. On the other hand, as the passenger half-rises from the seat when dismounting, the passenger is apart from the pressure-sensitive sensor 45. Thus, the pressure applied to the pressure-sensitive sensor 45 is reduced. It is thus possible to judge whether the passenger dismounts based on the output from the pressure-sensitive sensor 45. More specifically, the seat pressure detected by the pressure-sensitive sensor 45 and the threshold value are compared. When the seat pressure is smaller than the threshold value, it is judged that the passenger dismounts.

Alternatively, it is judged whether the passenger dismounts by the body inclination angle estimated based on the output from the gyro-sensor 48. For example, when the body inclination angle in the front-back direction is large, it is judged that the passenger dismounts. More specifically, the passenger stoops when trying to dismount. In such a case, the body 12 is inclined in the forward direction, and the body inclination angle becomes larger. Thus, it is possible to judge whether the passenger dismounts based on the body inclination angle estimated by the gyro-sensor 48. More specifically, the body inclination angle and the threshold value are compared. When the body inclination angle is larger than the threshold value, it is judged that the passenger dismounts. In summary, it is judged that the passenger dismounts when the body 12 is inclined forward in the moving direction from the vertical direction for more than certain degrees.

As will be understood from the above description, the pressure-sensitive sensor 45 and the gyro-sensor 48 are provided to judge whether the passenger dismounts. The outputs of the gyro-sensor 48 and the pressure-sensitive sensor 45 vary depending on the states of the passenger that is the transportation object. Accordingly, it is possible to judge whether the passenger dismounts based on the output of the gyro-sensor 48 or the pressure-sensitive sensor 45. As a matter of course, it is also possible to judge whether the passenger dismounts using both of the gyro-sensor 48 and the pressure-sensitive sensor 45. Upon judgment of dismount, the mode is changed from the normal travelling mode in which normal travelling processing is performed to the overturn preventing mode to prevent overturn. The processing for dismounting will be described later.

Furthermore, the control unit 80 is mounted on the backrest unit of the passenger seat 22. The control unit 80 controls the travelling (movement) of the moving body 100 by controlling the right wheel drive motor 34 and the left wheel drive motor 36 in accordance with the manipulations carried out on the manipulation module 46 by the passenger. The seating surface of the passenger seat 22 is disposed in parallel to the upper surface of the pedestal 70. The control unit 80 controls the right wheel drive motor 34 and the left wheel drive motor 36 in accordance with the manipulations carried out on the manipulation module 46. In this manner, the right wheel drive motor 34 and the left wheel drive motor 36 are driven in accordance with the command input according to the manipulations carried out on the manipulation module 46.

The control unit 80 includes a CPU (Central Processing Unit), a ROM (Read Only Memory), a RAM (Random Access Memory), a communication interface, and the like, and controls various operations of the moving body 100. Further, the control unit 80 carries out various control in accordance with a control program stored, for example, in the ROM. The control unit 80 controls the right wheel drive motor 34 and the left wheel drive motor 36 independently from each other by using well-known feedback control at the predetermined angle. The right wheel drive motor 34 and the left wheel drive motor 36 rotate according to the command input in accordance with the manipulations in the manipulation module 46. For example, the manipulation module 46 is equipped with the sensor measuring the tilt angle of the manipulation lever. The manipulation module 46 calculates the accelerations and the target velocity by the tilt angle of the manipulation lever and the variations of the tilt angle. More specifically, the accelerations and the target velocity increase as the tilt angle of the manipulation lever increases. Then, the right wheel drive motor 34 and the left wheel drive motor 36 are controlled so as to be able to achieve desired accelerations and target velocity.

Further, the output signal from the gyro-sensor 48 or the pressure-sensitive sensor 45 is input to the control unit 80. The control unit 80 judges whether the passenger dismounts based on the output from the pressure-sensitive sensor 45. More specifically, the output value from the pressure-sensitive sensor 45 is compared with the threshold value. When the output value is lower than the threshold value, it is judged that the passenger dismounts.

Furthermore, the control unit 80 controls the angle of each joint of the right arm 14 and the left arm 16. Each joint is independently driven. The posture of the moving body 100 varies by driving the right arm 14 and the left arm 16. In short, the control unit 80 controls the height of the moving body 100 and the inclination angle of the lateral direction.

For example, when the right arm 14 or the left arm 16 is driven, the pedestal 70 can be inclined in the lateral direction. In short, it is possible to autonomously swing and incline the body 12 of the moving body 100 in a roll direction (about the longitudinal axis of the moving body 100 parallel with a forward propelling direction). For example, the upper joint motor 66 and the lower joint motor 65 of the right arm 14 are driven to bend the right arm 14 into the dog leg shape. Specifically, the upper joint motor 66 and the lower joint motor 65 are rotated in an opposite direction with each other by a certain angle. Thus, the rotation axis C3 and the rotation axis C1 are close to each other. The vehicle height of the right side of the moving body 100 becomes lower. As such, by independently driving the right arm 14 and the left arm 16, the ride quality for the passenger can be improved. To be more specific, the body 12 can level off in the lateral direction even with the inclination or the step on the ground. In short, it is possible to prevent the body 12 from being inclined in the lateral direction and to improve the ride quality.

For example, the right arm 14 and the left arm 16 are extended during a time at which the moving body travels on the level ground. In other words, the distance from the rotation axis C1 to the rotation axis C3 and the distance from the rotation axis C2 to the rotation axis C3 are made equal to each other. Accordingly, the rotation axis C3 levels off, and the body 12 levels off in the lateral direction. When the right driving wheel 18 runs on a step while the moving body is travelling on the level ground, or when the moving body is travelling from the level ground to the inclined ground, the right driving wheel 18 becomes higher than the left driving wheel 20. Then, the rotation axis C3 inclines in the right upward direction and the body 12 is inclined in the lateral direction. In order to prevent the body 12 from being inclined in the lateral direction, the right arm 14 is driven as stated above. Then, the right arm 14 is bent into the dog leg shape and the rotation axis C1 and the rotation axis C3 are close to each other. On the other hand, as the left arm 16 is extended, the rotation axis C2 is away from the rotation axis C3. As such, the inclination of the rotation axis C3 varies, and the body 12 can level off.

More specifically, it is detected by the output from the gyro-sensor 48 that the body 12 is inclined in the lateral direction. The control unit 80 drives one of the arms according to the output from the gyro-sensor 48. In other words, the control unit 80 drives the arm which is made higher by the inclination. For example, when the right side of the body 12 is higher, the control unit 80 controls each joint of the right arm 14. Then, the lower joint motor 65 and the upper joint motor 66 are driven to bend the right arm 14. Further, the right arm 14 is bent by the length corresponding to the inclination angle of the body 12. In other words, the upper joint 61 and the lower joint 63 are driven by the rotation angle corresponding to the inclination angle of the body 12 in the lateral direction. Thus, the rotation axis C3 levels off and the body 12 levels off in the lateral direction. As a matter of course, when the left side of the body 12 is higher, the left arm 16 is driven in the same way. As such, the right arm 14 and the left arm 16 serve as swing arms that correct the inclination of the body 12 in the horizontal direction.

Figure 3A:
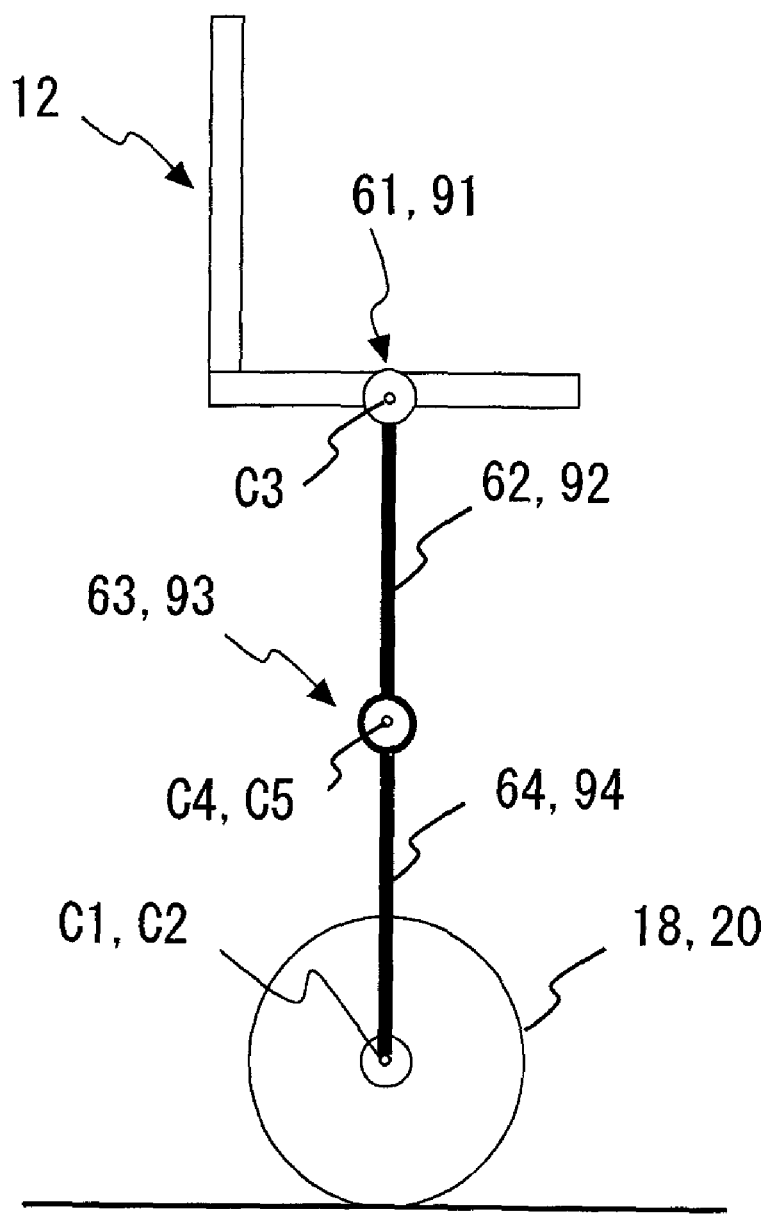
FIG. 3A A side view describing overturn preventing operation of the moving body according to the embodiment of the present invention.
Figure 3B:
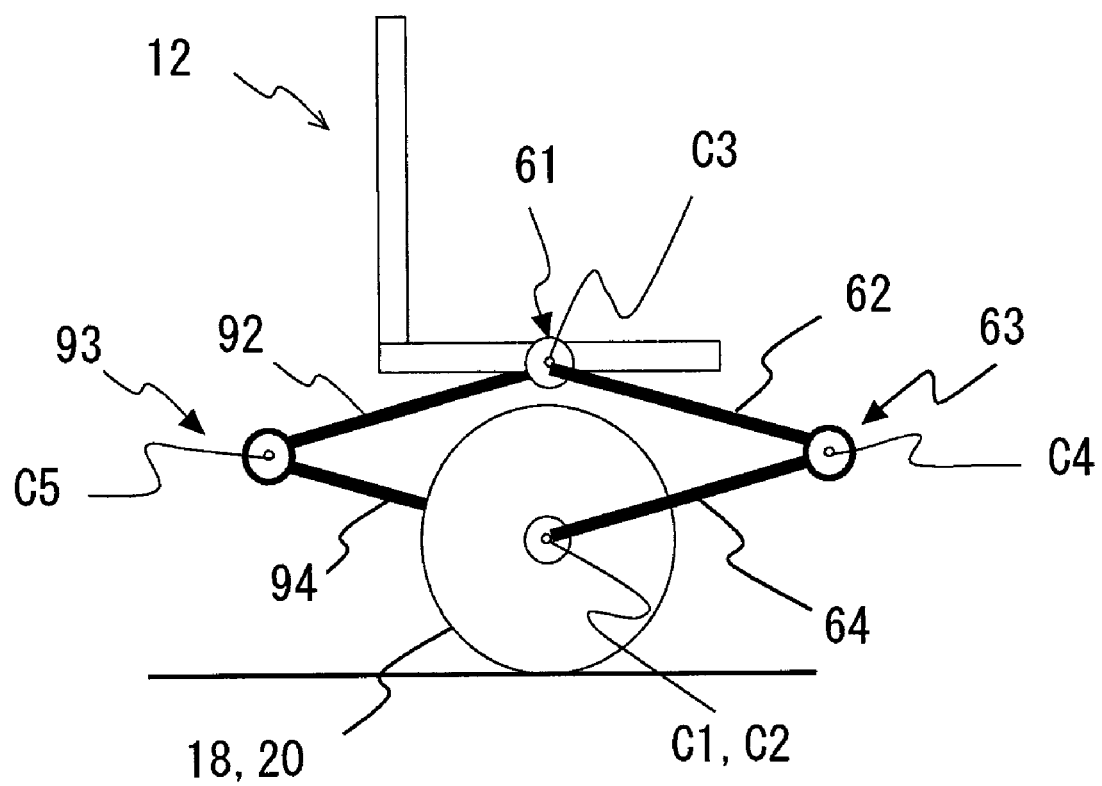
FIG. 3B A side view describing overturn preventing operation of the moving body according to the embodiment of the present invention.

Furthermore, when the passenger dismounts, the control unit 80 drives both of the right arm 14 and the left arm 16 to execute the overturn preventing operation. For example, the right arm 14 and the left arm 16 are bent into the dog leg shape from a state shown in FIG. 3A in which the right arm 14 and the left arm 16 are extended. Accordingly, as shown in FIG. 3B, the body 12 moves downwardly, which lowers the vehicle height. FIGS. 3A and 3B are side views describing the operation of the arms of the moving body 100. Here, each joint is rotated in a way that the height of the rotation axis C4 is equal to the height of the rotation axis C5. Accordingly, the rotation axis C4 and the rotation axis C5 are in the same horizontal plane. Thus, the position of the center of mass of the body 12 becomes lower while keeping the body 12 horizontal in the lateral direction. In other words, the position of the center of mass of the body 12 approaches the rotation axes C1 and C2. The vehicle height of the moving body 100 can thus be lowered. In summary, the highest part of the body 12 approaches the ground, and the seating surface is lowered. Thus, the center of mass of the body is lowered, thereby preventing the body 12 from overturning.

Further, in a state shown in FIG. 3B, the lower joint 63 projects in the forward direction. The lower joint 63 that projects anterior to the body 12 serves as an overturn preventing unit that prevents overturn in the forward direction. In summary, when the moving body 100 is greatly inclined forward, the lower joint 63 which is the overturn preventing unit contacts with the ground. Thus, overturn of the body 12 can be prevented. Further, the lower joint 93 projects in the backward direction. The lower joint 93 that projects posterior to the body 12 serves as an overturn preventing unit that prevents overturn in the backward direction. In summary, when the moving body 100 is greatly inclined backward, the lower joint 93 which is the overturn preventing unit contacts with the ground. Thus, overturn of the body 12 can be prevented. Accordingly, by deploying the overturn preventing unit in the front-back direction and lowering the position of the center of mass of the body 12, the overturn preventing operation is performed.

The right arm 14 and the left arm 16 are rotated by the same angle in opposite directions with each other. More specifically, when the operation moves from FIG. 3A to FIG. 3B, the lower joint 63 rotates in a counterclockwise direction, while the lower joint 93 in a clockwise direction. Further, the rotation angles of the lower joint 63 and the lower joint 93 are made the same. Furthermore, the upper joint 61 rotates in the clockwise direction, and the upper joint 91 in the counter-clockwise direction. Then, the rotation angles of the upper joint 61 and the upper joint 91 are made the same. Accordingly, the configuration is obtained in which the right arm 14 and the left arm 16 are inverted to each other. In other words, when the moving body 100 is seen from the lateral direction with the state shown in FIG. 3B, the right arm 14 and the left arm 16 are inverted with respect to the vertical line that extends from the rotation axis C3 to the ground. Then, the rotation axis C3 is arranged on the axle that connects the rotation axis C1 and the rotation axis C2. Further, each joint is driven in synchronization with each other. Thus, it is possible to prevent the body 12 from being inclined in the lateral direction, which enhances the ride quality. The stability can thus be improved.

Furthermore, even when the arms are bent, as shown in FIG. 3B, the lower joints 63 and 93 are made higher than the axles C1 and C2. In summary, as the lower joints 63 and 93 are projected in the forward and the backward directions, the parts which firstly contact with the ground upon occurrence of the overturn can be made higher. As such, the lower joints 63 and 93 are projected in the forward and the backward directions above the axles C1 and C2. Accordingly, the overturn can be prevented that may occur when the lower joints 63 and 93 of the arms 14 and 16 run on the ground. In summary, the lower joints 63 and 93 that firstly contact with the ground upon occurrence of overturn are arranged to be apart from the ground with a certain distance. This is due to the fact that the lower joints 63 and 93 are projected in the forward and backward of the body 12 by bending the arms. In other words, by optimizing the length of the both arms and the angle of the joints, the clearance of the lower joints 63 and 93 against the ground can be maintained. Accordingly, overturn due to running-on can be prevented even when the lower joints 63 and 93 are projected anterior and posterior to the body 12. Thus, the overturn can be prevented at the ground with a step or the like. Alternatively, the impact may be absorbed by providing an elastic body at a position that contacts with the ground.

When the passenger dismounts from the passenger seat, variations of the position of the center of mass of the body 12 in the front-back direction increases. In summary, the operation of the passenger greatly varies the position of the center of mass of the body 12. Thus, it becomes difficult to keep inverted state, and the body becomes unstable. Thus, by executing the overturn preventing operation as above, even when the position of the center of mass of the body 12 greatly varies when dismounting, overturn can be prevented. Accordingly, prompt dismount can be possible, and convenience when dismounting can be improved. Even when the passenger dismounts accidentally or suddenly, overturn can be prevented, thereby enhancing convenience.

When dismounting from the body 12, the passenger moves in the forward direction from the passenger seat 22. At this time, the body 12 inclines in the forward direction, which increases the body inclination angle. Thus, when feedback control is performed to keep the inverted state, the body 12 is accelerated and hits against the passenger. The control unit 80 performs the processing to prevent such a case. This processing will be described later.

Figure 4:
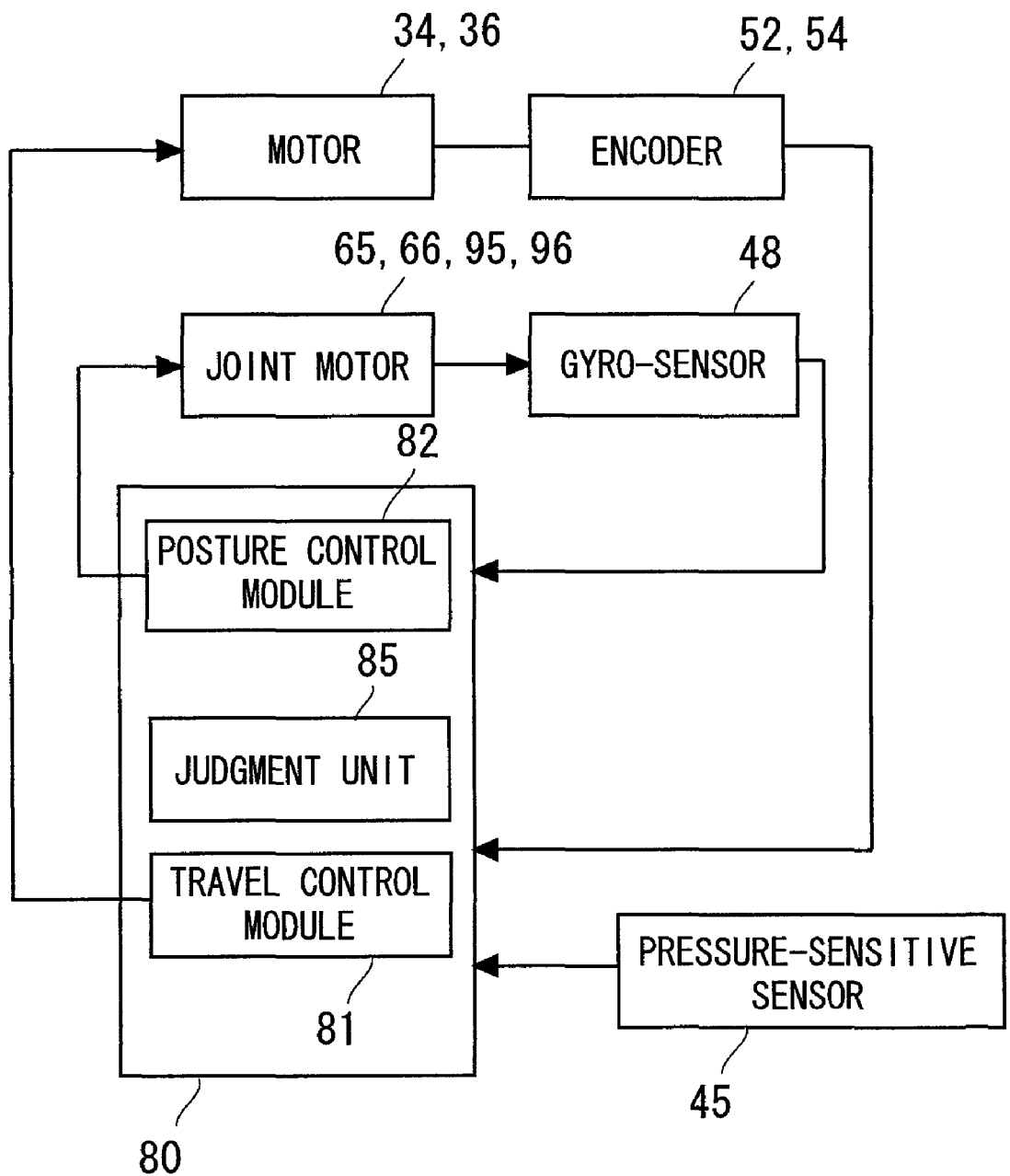
FIG. 4 A block diagram showing the structure of a control system of the moving body according to the embodiment of the present invention.

Now, the control by the control unit 80 will be described with reference to FIG. 4. FIG. 4 is a block diagram describing the control of the control unit 80. First, processing of performing the normal travelling will be described. As shown in FIG. 4, the control unit 80 includes a travel control module 81 and a posture control module 82. The control unit 80 controls the travel control module 81 and the posture control module 82 in an integrated manner. The travel control module 81 includes amplifiers controlling the right wheel drive motor 34 and the left wheel drive motor 36. The travel control module 81 outputs drive signals to the right wheel drive motor 34 and the left wheel drive motor 36, and performs feedback control of the right driving wheel 18 and the left driving wheel 20. More specifically, measured values obtained by the right wheel encoder 52 and the left wheel encoder 54 are input to the travel control module 81. Further, the inclination angle velocity obtained by the gyro-sensor 48 is input to the travel control module 81 so that the inverted state becomes stable. Furthermore, command input corresponding to the manipulations carried out on the manipulation module 46 is input to the travel control module 81. Then, the travel control module 81 drives the right wheel drive motor 34 and the left wheel drive motor 36 based on the measured values, the command input, and the inclination angle velocity. In this manner, the travel control module 81 performs feedback control of the right driving wheel 18 and the left driving wheel 20. As a result, the moving body 100 moves in accordance with the manipulations carried out on the manipulation module 46. As a result, the moving body 100 travels stably in the inverted state. In this case, a well-known control method can be employed as the feedback control.

For example, when the moving body travels normally, the target inclination angle is set to 0° to keep the inverted state. In summary, the inclination angle in which the right arm 14 and the left arm 16 are in the vertical direction is set as the target inclination angle. Further, the current body inclination angle is estimated from the output of the gyro-sensor 48. An invert control value is calculated by multiplying a difference between the target inclination angle and the current body inclination angle by a certain feedback gain. Further, the target velocity is calculated by the command input in accordance with the input from the manipulation module 46. Further, the current velocity of the moving body 100 is estimated from the outputs of the encoders 52 and 54. Then, the movement control value is calculated by multiplying a difference between the target velocity and the current velocity by a certain feedback gain. Then, by adding the movement control value and the invert control value, the drive control value to drive the right wheel drive motor 34 and the left wheel drive motor 36 is calculated. Then, the right wheel drive motor 34 and the left wheel drive motor 36 are driven at a drive torque based on the drive control value. Accordingly, the travel control module 81 sets the target inclination angle and the target velocity as command values, and performs feedback control in accordance with the command values.

The posture control module 82 controls the posture of the moving body 100. That is, the posture control module 82 includes amplifiers that drive the motors of each joint of the right arm 14 and the left arm 16. The posture control module 82 outputs control signals to control the posture of the right arm 14 and the left arm 16. More specifically, a detection signal indicating the inclination angle velocity of the body 12 is input to the posture control module 82 from the gyro-sensor 48. In summary, the inclination angle velocity values of the body 12 detected in the gyro-sensor 48 are input to the posture control module 82. Then, it is detected by the inclination angle velocity detected at the gyro-sensor 48 that the body 12 is inclined in the lateral direction. When the body 12 is inclined in the lateral direction, the right arm 14 or the left arm 16 is driven. In this case, the body 12 drives the arm which is higher to correct the inclination angle. In short, the posture control module 82 controls one of the arms so as to cancel out the inclination angle. Thus, the variations of the inclination angle in the lateral direction decreases, which makes it possible to stably travel the vehicle. It is possible to improve the ride quality for the passenger.

Further, when the passenger dismounts, the posture control module 82 controls driving of the right arm 14 and the left arm 16. Accordingly, the vehicle height can be made lower. In other words, the state is changed from the one shown in FIG. 3A to the one shown in FIG. 3B, and the position of the center of mass of the body 12 is lowered. The outputs from the pressure-sensitive sensor 45 and the gyro-sensor 48 are input to the control unit 80. The control unit 80 includes a judgment unit 85 to judge whether the passenger dismounts. The judgment unit 85 judges whether the passenger dismounts based on the outputs from the pressure-sensitive sensor 45 and the gyro-sensor 48. More specifically, the control unit 80 estimates the body inclination angle based on the output from the gyro-sensor 48. Then, the body inclination angle and the threshold value are compared. When the body inclination angle exceeds the threshold value, it is judged that the passenger dismounts. In summary, when the body 12 is greatly inclined in the front-back direction, it is judged that the passenger dismounts. Alternatively, it is judged that the passenger dismounts when the seat pressure detected by the pressure-sensitive sensor 45 becomes lower than the threshold value.

Figure 5:
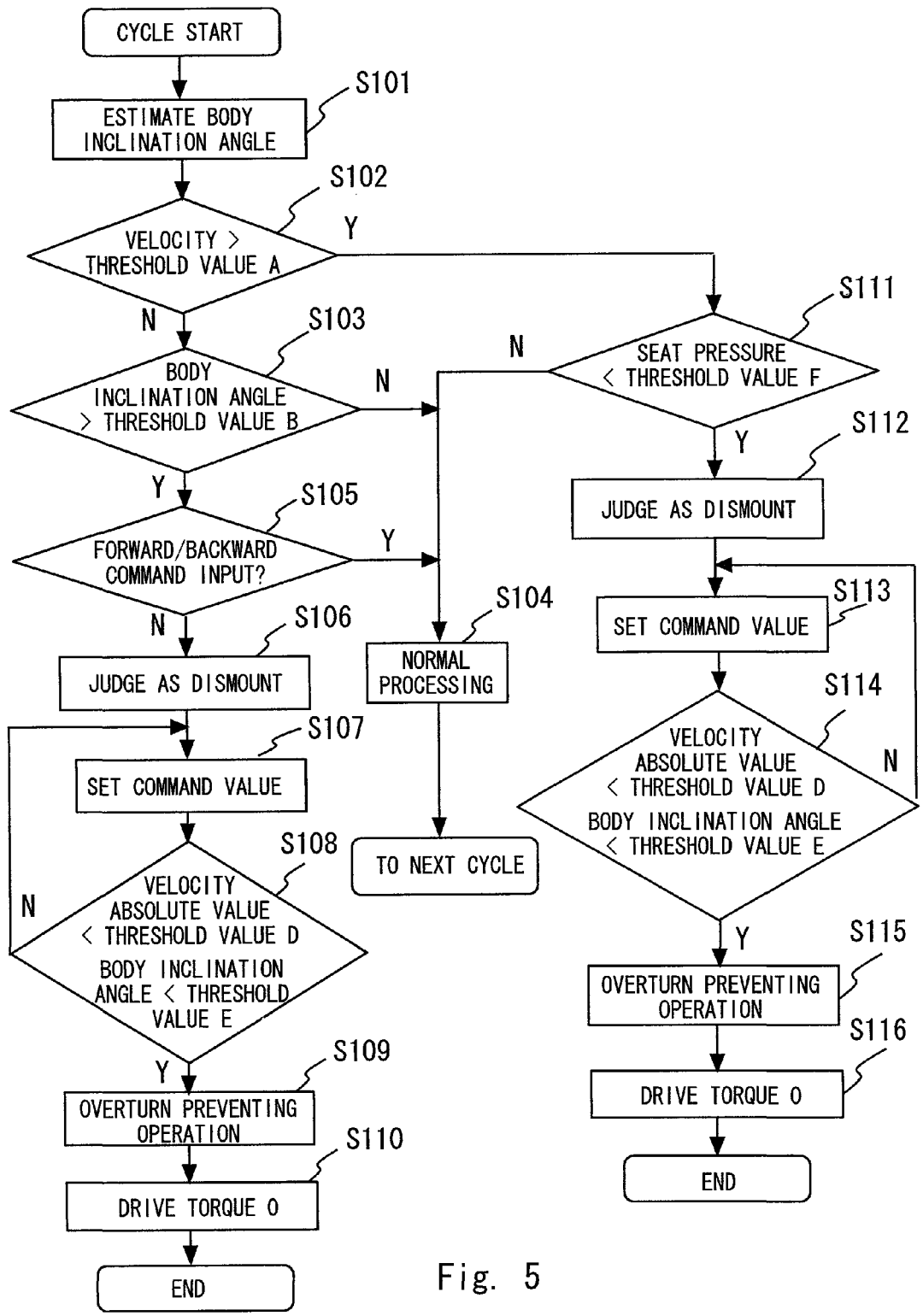
FIG. 5 A flowchart showing a control method for the moving body according to a first embodiment of the present invention.

Next, the control performed when the passenger dismounts will be described with reference to FIG. 5. FIG. 5 is a flow chart showing the control method as above. A control cycle to perform dismounting processing for dismounting will be described with reference to FIG. 5. In other words, the control performed when the mode is changed from the normal travelling mode to the overturn preventing mode when the passenger dismounts will be described. First, the body inclination angle when the moving body 100 travels is estimated (step S101). The body inclination angle can be estimated by integrating the inclination angle velocities output from the gyro-sensor 48. The body inclination angle is, for example, estimated at a certain cycle. Then, the velocity of the moving body 100 and the threshold value A are compared (step S102). In short, it is judged whether the moving body 100 travels at or more than a certain velocity. For example, judgment is made based on the outputs from the sensor 58 or the encoders 52 and 54. First, a case will be described in which the velocity of the moving body 100 does not exceed the certain velocity.

When the velocity of the moving body 100 is lower than the threshold value A, the body inclination angle and the threshold value B are compared (step S103). In short, it is judged whether the inclination angle in the front-back direction is equal to or more than the threshold value B. For example, when the direction of the right arm 14 and the left arm 16 greatly tilts from the vertical direction, the body inclination angle exceeds the threshold value B. When the body inclination angle does not exceed the threshold value B, it is judged that the passenger does not dismount. In this case, normal processing is performed (step S104), and the process goes to the next cycle. In short, the processing to perform normal travelling is performed and the process goes back to step S101.

When the body inclination angle exceeds the threshold value B, it is judged that the passenger may dismount. More specifically, when trying to dismount, the passenger moves his/her weight on the body 12. Thus, the body inclination angle increases. In such a case, it is judged that the passenger may dismount. When the body inclination angle exceeds the threshold value B, it is judged whether there is forward/backward command input (step S105). In summary, it is judged whether there is forward/backward command input based on the command input from the manipulation module 46. More specifically, when the manipulation lever tilts in the forward or backward direction, it is judged that there is forward/backward command input. When it is judged that there is forward/backward command input, it is judged that the passenger does not dismount even when the body inclination angle exceeds the threshold value B. Specifically, when there is forward/backward command input, the moving body 100 accelerates or decelerates according to the forward/backward command input. Thus, the body inclination angle may exceed the threshold value B. Thus, it is judged that the passenger does not dismount when there is forward/backward command input even when the body inclination angle exceeds the threshold value B. In such a case, the normal processing is performed (step S104), and the process goes to the next cycle.

When there is no forward/backward command input, it is judged that the passenger dismounts (step S106). Then, the command value that makes the body move in the direction opposite to the travelling direction is set (step S107). In other words, the target inclination angle that makes the body incline backwardly against the moving direction is set. Thus, the moving body 100 promptly decelerates. More specifically, the target inclination angle is shifted backwardly from 0°, and the target velocity is set to 0. Accordingly, the body 12 is controlled to incline in the direction opposite to the travelling direction. Thus, the target inclination angle is set to the negative value so that the body 12 is inclined in the backward direction. The travel control module 88 performs control in accordance with the target inclination angle and the target velocity. By changing the target inclination angle and the target velocity, the body can promptly decelerate. The target inclination angle that makes the body move in the direction opposite to the travelling direction is set. The target inclination angle such as an angle inverted the body inclination angle, when it is judged as dismount, with respect to the vertical direction are applied. The body 12 that is inclined in the forward direction with respect to the travelling direction is gradually inclined backwardly.

It is also possible to set torque command that allows the body 12 to incline in the direction opposite to the moving direction upon judgment that the transportation object dismounts. The motors 34, 36 rotate the right driving wheel 18 and the left driving wheel 20 based on this torque command. In summary, the drive torque of the motors 34 and 36 is set as the torque command value, so as to rotationally drive the right driving wheel 18 and the left driving wheel 20. Thus, as is similar to the above description, the moving body 100 inclines in the backward direction, and promptly decelerates. Then, after setting the torque command, the control unit 80 feedback controls the motors 34 and 36 to keep the stable inverted state. For example, the control unit 80 rotates the right driving wheel 18 and the left driving wheel 20 at torque command that allows the moving body to incline in the direction opposite to the moving direction for a predetermined period that is set in advance. Thereafter, the feedback control is performed to keep the stable inverted state. As such, the moving body can promptly decelerate also by applying the torque command instead of the target inclination angle.

Then, the absolute value of the velocity of the moving body 100 is compared with the threshold value D, and the body inclination angle is compared with the threshold value E (step S108). When the absolute value of the velocity becomes smaller than the threshold value D and the body inclination angle is smaller than the threshold value E, the overturn preventing operation is performed (step S109). As such, the overturn preventing operation is performed when the velocity is included in a certain range and the body inclination angle is included in a certain range. Note that the threshold value D with respect to the absolute value of the velocity is smaller than the threshold value A of step S101. When at least one of the absolute value of the velocity and the body inclination angle is not included in a certain range, the process goes back to step S108. Then, the processing of steps S107 and S108 is repeated until when the absolute value of the velocity becomes smaller than the threshold value D and the body inclination angle becomes smaller than the threshold value E. At this time, the command value may be constant, or may be changed according to the velocity.

In step S109, the right arm 14 and the left arm 16 are driven, so as to make the vehicle height lower as shown in FIG. 3B. When each joint of the right arm 14 and the left arm 16 rotates to a certain angle, the overturn preventing operation is completed. Upon completion of the overturn preventing operation, the drive torque is set to 0 (step S110). In summary, the drive torque is immediately set to 0. The moving body 100 moves by inertia, resulting in the moving body 100 stopping the movement. When the moving body 100 that has moved at or less than a certain velocity sets the drive torque to 0, the velocity is lower than the threshold value D. Thus, after setting the drive torque to 0, the inertia force applied to the moving body 100 becomes almost 0. Accordingly, the moving body 100 hardly moves after step S109.

Note that the operation of steps S109 and S110 may be performed in parallel. In summary, the drive torque is reduced while performing the overturn preventing operation. In this case, for example, the drive torque is reduced immediately after the overturn preventing operation is started. It is preferable to set the drive torque to 0 after the overturn preventing operation is completed. Alternatively, the drive torque may be set to 0 after ensuring the completion of the overturn preventing operation. Thus, it is judged whether the passenger dismounts based on presence or absence of forward/backward command input.

Figure 6A:
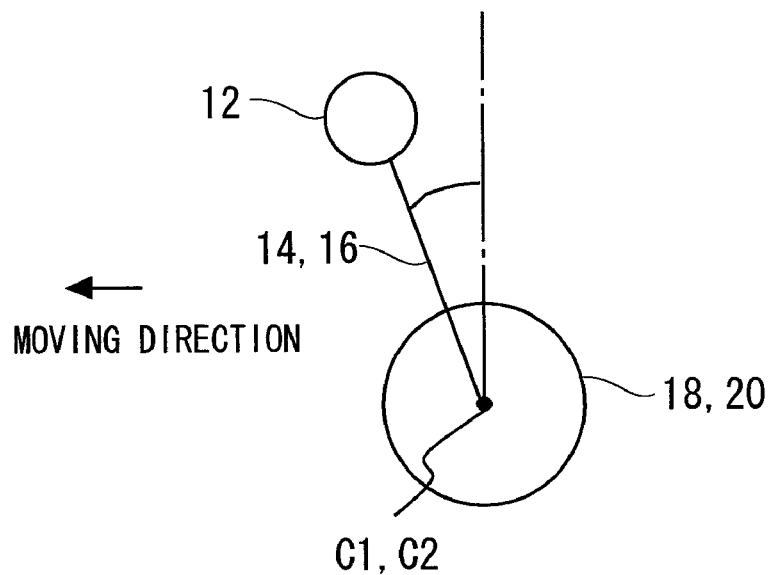
FIG. 6A A diagram in which operation of the moving body in translational direction is modeled according to the first embodiment of the present invention.
Figure 6B:
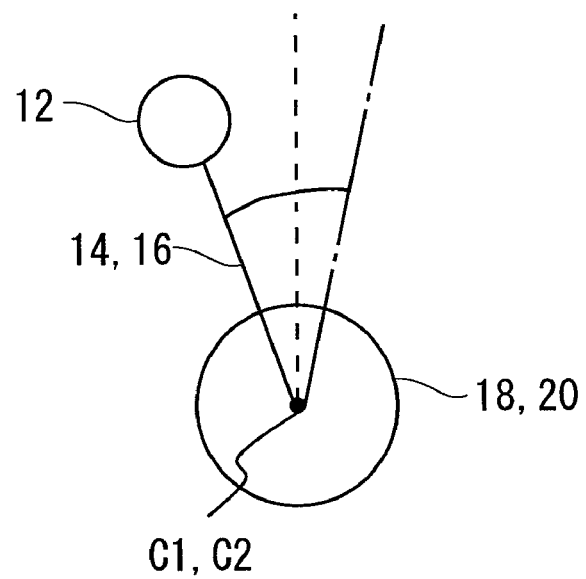
FIG. 6B A diagram in which operation of the moving body in translational direction is modeled according to the first embodiment of the present invention.

Now, the operation of the moving body 100 in steps S107 and S108 will be described in detail with reference to FIGS. 6A and 6B. FIGS. 6A and 6B are diagrams in which the operation of the moving body 100 in the translational direction is modeled. In FIGS. 6A and 6B, the position of the center of mass of the body 12 is shown as a representative example. In FIGS. 6A and 6B, it is assumed that the moving body 100 moves in left direction. Further, the translational movement in the front-back direction will be described. In this example, the body inclination angle becomes positive with a state in which the body 12 is inclined forward of the moving direction.

When the moving body 100 moves normally, as shown in FIG. 6A, the body 12 is inclined in the forward direction. In other words, the position of the center of mass of the body 12 is shifted anterior to the rotation axes C1 and C2 in the moving direction in the front-back direction. In this case, the body inclination angle is a positive value. When the moving body travels normally, the target inclination angle is set to 0. In FIGS. 6A and 6B, the target inclination angle is shown by an alternate long and short dash line. The control unit 80 performs feedback control so that the position of the center of mass of the body 12 is just above the axle. Thus, the right driving wheel 18 and the left driving wheel 20 are rotated to move in the front direction. In summary, the rotation of the right driving wheel 18 and the left driving wheel 20 is feedback controlled in accordance with the target inclination angle. Note that, when there is forward/backward command input, the rotation is feedback controlled to accelerate or decelerate the body based on the forward/backward command input. The moving body moves as stated above when it travels normally.

When the command value is set in step S107, the target inclination angle varies. More specifically, the target inclination angle changes from 0 to a negative value. In this case, the moving body 100 is accelerated so that the position of the center of mass of the body 12 is posterior to the axle. In short, the body 12 is feedback controlled so as to incline in the backward direction. Thus, forward drive torque is applied, and the angular velocities of the right driving wheel 18 and the left driving wheel 20 are increased. Note that the forward drive torque is the torque to increase accelerations in the forward side of the moving direction. Here, the target velocity of the moving body 100 is set to 0. Thus, when the angular velocities of the right driving wheel 18 and the left driving wheel 20 increase and the body inclination angle reaches around 0, the velocity reaches around 0. When the moving body 100 is accelerated, the velocity is made lower in accordance with the target velocity 0. Accordingly, as the body inclination angle gradually approaches the backward-inclined posture in accordance with the target inclination angle, the velocity is decreased. Thus, as shown in FIG. 6B, the position of the center of mass of the body 12 is moved on the axle. In the state shown in FIG. 6B, the absolute value of the velocity becomes smaller than the threshold value D, and the body inclination angle becomes smaller than the threshold value E. Then, the overturn preventing operation is performed from the state shown in FIG. 6B.

By performing such a control, the overturn preventing operation is executed after the moving body 100 sufficiently decelerates. In other words, the right arm 14 and the left arm 16 are driven after the body inclination angle is decreased and the moving body 100 is almost stopped. Accordingly, the moving body 100 hardly moves with a state in which the vehicle height is lowered. Accordingly, it is possible to prevent the right arm 14 and the left arm 16 protruding in the front-back direction from hitting against the obstacle. For example, it is possible to prevent the right arm 14 or the left arm 16 from running on the ground or hitting against the wall. Accordingly, it is possible to safely stop the body when the passenger dismounts. Furthermore, even when the passenger tries to dismount, the moving body 100 does not keep accelerating. In summary, as the velocity is promptly decreased, the inertia force becomes almost 0. The drive torque becomes 0 after the inertia force becomes almost 0. This prevents the moving body 100 that is unstable due to the dismount by the passenger from moving by inertia force. This realizes safe stop not only for the passenger but also for surrounding people. Thus, the area where the moving body 100 may be applied can be made wider, thereby enhancing convenience. In summary, as safety is enhanced, safe stop can be realized even at a place where there are a lot of people. Accordingly, this moving body can be applied in various places, which enhances convenience.

Although the case in which there is no command input is judged as dismount in the above example, the case in which there is command input may be judged as dismount. For example, when the command input (command input value) is equal to or less than a certain value, it may be judged that the passenger dismounts. Alternatively, it may be judged that the passenger dismounts when there is command input of stop.

Next, description will be made on a case in which the velocity of the moving body 100 exceeds the certain velocity. When the moving body 100 exceeds the certain velocity, the seat pressure measured in the pressure-sensitive sensor 45 and the threshold value F are compared (step S111). When the seat pressure is lower than the threshold value F, it is judged that the passenger dismounts (step S112). In summary, when the seat pressure is lower than the threshold value F, it is assumed that the passenger has moved his/her weight for dismounting. On the other hand, when the seat pressure is equal to or more than the threshold value F, normal processing is performed (step S104), and the process moves to the next cycle.

When it is judged that the seat pressure is lower than the threshold value, which means the passenger dismounts, the command value that makes the body move in the direction opposite to the moving direction is set (step S113). Thus, the moving body 100 promptly decelerates. Similarly to step S107, the target inclination angle and the target velocity are set. Specifically, the target inclination angle is made negative and the target velocity is made 0. Further, as the velocity of the moving body 100 is higher in step S113 than in step S107, the absolute value of the target inclination angle is made higher than that in step S107. In short, the deviation of the inclination angle with respect to the vertical direction is made larger. In other words, the target inclination angle is set that allows further inclination in the backward direction compared with step S107. The absolute value of the target inclination angle in step S113 becomes larger than the absolute value of the target inclination angle of step S107. Thus, the absolute value of the target inclination angle is changed according to the velocity. More specifically, the value of the target inclination angle set in dismounting is changed in accordance with the velocity of the moving body 100. Then, the target inclination angle that allows further inclination in the backward of the moving direction is set as the velocity is higher. By performing such a control, prompt deceleration is made possible. Note that, when the torque command is applied instead of the target inclination angle, the torque command may be changed according to the velocities. As a matter of course, the torque command may be a certain value.

Then, the threshold value and the absolute value of the velocity of the moving body 100 are compared, and the body inclination angle is compared with the threshold value (step S114). When the absolute value of the velocity becomes smaller than the threshold value D and the body inclination angle is smaller than the threshold value E, the overturn preventing operation is executed (step S115). In summary, when the velocity is included in a certain range and the body inclination angle is included in a certain range, the overturn preventing operation is executed. Then, after executing the overturn preventing operation, the drive torque is set to 0 (step S116). As step S114 to step S116 are similar to step S108 to step S110, detailed description will be omitted.

By performing such a control, the similar effect as above can be obtained. For example, the velocity of the moving body 100 that has moved at or more than the threshold value A becomes lower than the threshold value D at a timing at which the drive torque is made 0. Thus, after setting the drive torque to 0, inertia force applied to the moving body 100 becomes almost 0. Thus, safety level can be improved, and higher convenience can be realized. Further, it is possible to promptly decelerate the moving body 100 that moves at or more than a certain velocity. Thus, prompt dismount can be realized, which enhances convenience. Further, when the velocity exceeds the threshold value A, it is judged whether the passenger dismounts using the seat pressure. Accordingly, it is possible to judge whether the passenger dismounts more accurately. Thus, convenience can be enhanced.

Note that, in the first embodiment, the overturn preventing operation may be promptly performed when it is judged in step S102 that the velocity does not exceed the threshold value A. In short, the processing of step S107 and step S108 can be omitted. Even with such a control, safe dismount can be promptly performed. When the velocity of the moving body 100 does not exceed the certain velocity, it is judged whether the passenger dismounts using both of the body inclination angle and the forward/backward command input. Accordingly, it is possible to judge whether the dismount is the one intended by the passenger or not. For example, when the body inclination angle exceeds the threshold value B when there is no forward/backward command input, it is judged that the dismount is the one that is not intended by the passenger. Thus, it is judged as accidental dismount. In such a case, the overturn preventing operation is performed, and thereafter the drive torque is set to 0. As the moving body moves at or less than a certain velocity, even when the command value is not changed after performing the overturn preventing operation, the arms do not run on the ground or hit the obstacle. Thus, even when the drive torque is promptly set to 0, safe dismount can be promptly performed, thereby enhancing convenience. Further, when there is forward/backward command input, it is not judged that the passenger dismounts. Accordingly, when the body inclination angle exceeds the threshold value by abrupt acceleration or deceleration, the overturn preventing operation is not performed. As it is possible to prevent false judgment as dismount, it is possible to prevent execution of the overturn preventing operation when it is not desired. Thus, it is not judged as dismount even when the body inclination angle is abruptly inclined when abrupt acceleration or deceleration is performed. Thus, normal travelling is not interrupted when the passenger desires to move. Thus, convenience can be enhanced.

Although the example of driving the right arm 14 and the left arm 16 as the overturn preventing operation has been described in the above description, the overturn preventing operation is not limited to this example. In short, the overturn preventing mechanism is not limited to the arm mechanism. For example, sub wheels (trailing wheels) projecting in the front-back direction may be used as the overturn preventing mechanism. In such a case, the sub wheels are provided in end parts of struts that can be extended and retracted. Then, the strut is deployed to project the sub wheel in the front-back direction of the body 12. As a matter of course, a mechanism such as a safety bar may be driven. In the present embodiment, various overturn preventing mechanisms may be employed. The overturn preventing member such as the sub wheels or the safety bar may be deployed in the front side and the back side of the body 12 to perform the overturn preventing operation. Otherwise, the overturn preventing operation may be performed by lowering the position of the center of mass of the body 12. Accordingly, overturn may be definitely prevented. As a matter of course, two or more overturn preventing mechanisms may be combined for operation.

Note that, in steps S107 and S113, the target inclination angle is set to a negative value. In other words, the target inclination angle that is opposite to the body inclination angle when it is judged as dismount is set with respect to the vertical direction. By performing such a control, the moving body 100 promptly decelerates. Thus, safety and convenience can be enhanced. As a matter of course, control for deceleration is not limited to the above control. For example, the position of the center of mass of the body is estimated, and the target inclination angle of the body can be estimated to be balanced. Such a method is disclosed in Japanese Unexamined Patent Application Publication No. 2007-11634. More specifically, external force, which is moment of inertia around the rotation axes C1 and C2 generated by external force applied on the body 12, is estimated. Then, the body inclination angle, which makes gravity moment around the rotation axes C1 and C2 of the centroid of the body 12 balance with the external force moment, is set as the target inclination angle. By performing control as above, prompt deceleration is realized. Otherwise, the target velocity can be a negative value. Thus, the target velocity that makes the moving direction opposite may be set.

Second Embodiment

Figure 7:
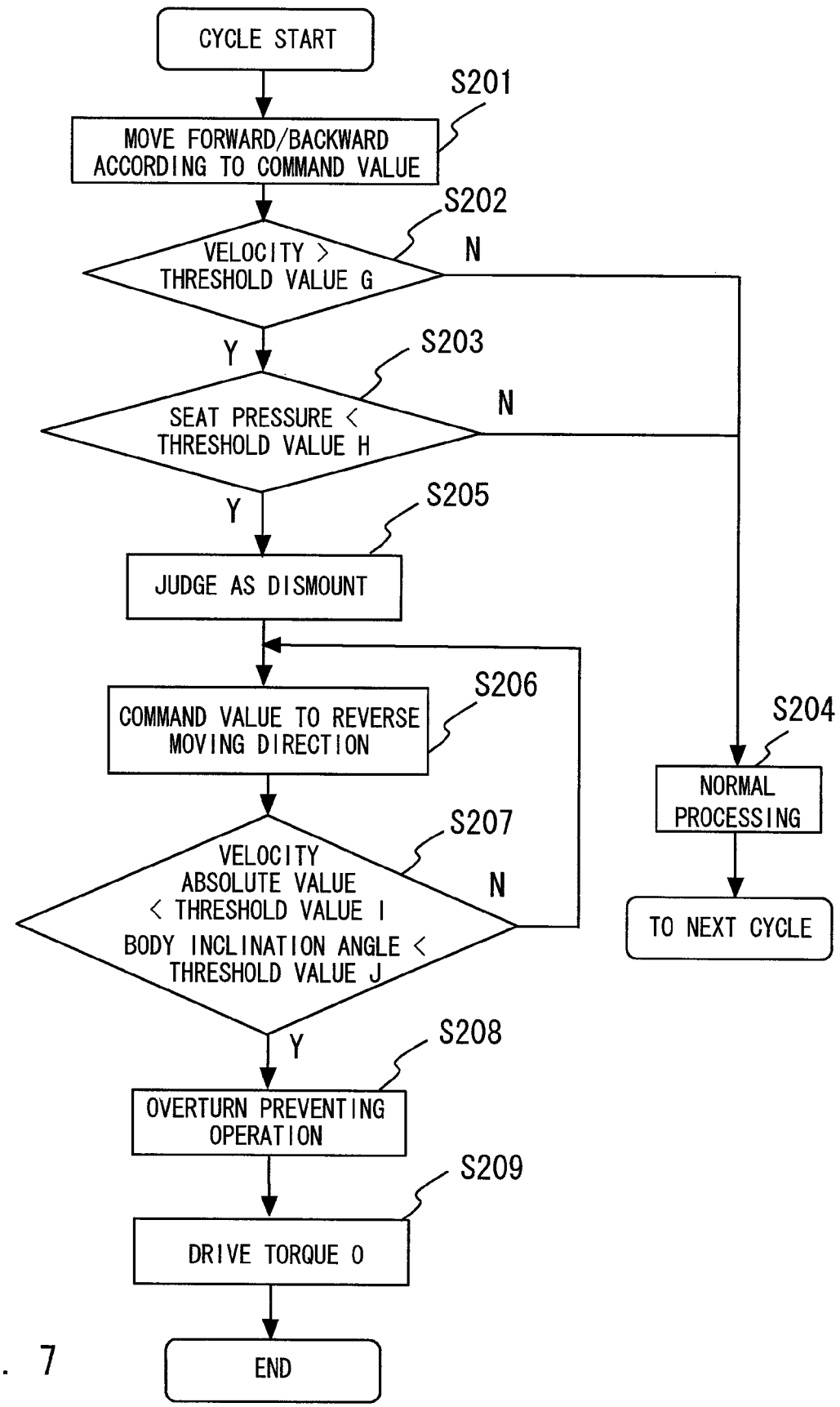
FIG. 7 A flow chart showing a control method for the moving body according to a second embodiment of the present invention.

A control method of the moving body 100 according to the second embodiment will be described with reference to FIG. 7. FIG. 7 is a flow chart showing a control method of the moving body 100 according to the second embodiment. The basic structure and the operation of the moving body 100 are similar to those shown in the first embodiment, and thus the description will be omitted.

FIG. 7 shows processing when the moving body moves in the forward/backward direction according to the command input. When the moving body moves in the forward/backward direction according to the command input (step S201), the velocity is compared with the threshold value G (step S202). In short, it is judged whether the moving body 100 moves at or more than a certain velocity. The threshold value G may be different from the threshold value A of the first embodiment, or may be the same. When the velocity of the moving body 100 exceeds the threshold value G, the seat pressure and the threshold value H are compared (step S203). On the other hand, when the translational velocity of the moving body 100 does not exceed the threshold value G, the normal processing is performed (step S204). After step S204, the next cycle is repeated as is similar to the first embodiment. In short, the process goes back to step S201.

When it is judged in step S203 that the seat pressure does not exceed the threshold value H, it is judged that the passenger dismounts (step S205). Then, the command value that makes the body move in the direction opposite to the moving direction is set as is similar to the first embodiment (step S206). For example, the target inclination angle is set to the negative value and the target velocity is set to 0. On the other hand, when it is judged in step S203 that the seat pressure exceeds the threshold value H, the normal processing is performed (step S204).

When the command value is set, the absolute value of the velocity is compared with the threshold value I, and the body inclination angle is compared with the threshold value J (step S207). When the absolute value of the velocity is smaller than the threshold value I and the body inclination angle is smaller than the threshold value J, the overturn preventing operation is executed (step S208). Otherwise, the process goes back to step S206. After executing the overturn preventing operation, the drive torque is set to 0 (step S209). Note that each of steps S205 to S209 is similar to steps S111 to S115 of the first embodiment, and thus the description will be omitted.

By performing such a control, the same effect as in the first embodiment can be obtained. In other words, when the body moves in the forward/backward direction in accordance with the command value, it is estimated that the body moves at or more than a certain velocity. Thus, prompt deceleration can be performed. Further, as the overturn preventing operation is started after deceleration, safety can be enhanced when the passenger dismounts. This enhances convenience.

Figure 8:
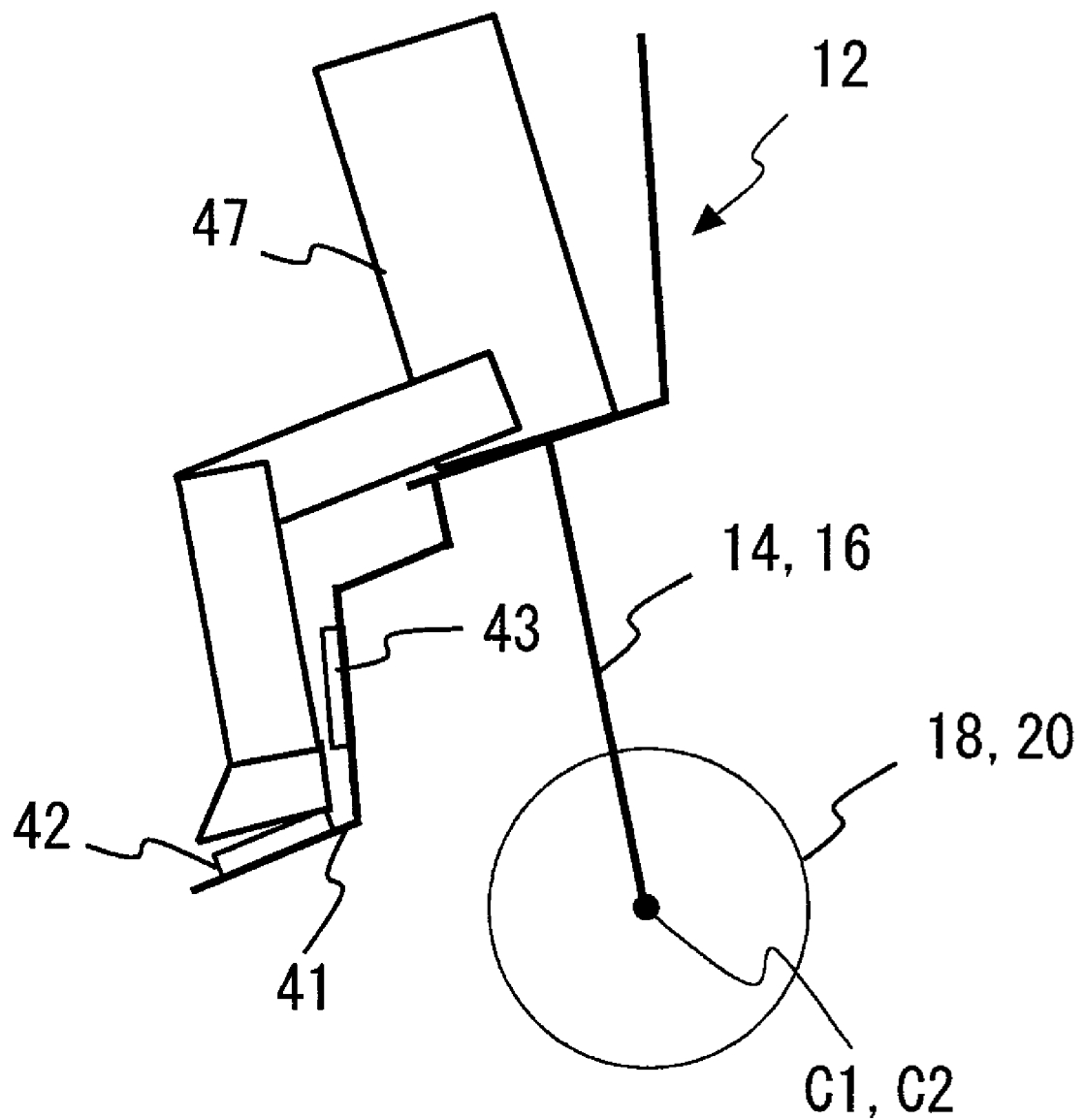
FIG. 8 A side view schematically showing an example of sensors of the moving body according to the embodiment of the present invention.

Although it has been judged in the first and second embodiments whether the passenger dismounts based on the seat pressure or the body inclination angle, it is not limited to this example. Another example of the sensor provided for judging dismount will be described with reference to FIG. 8. FIG. 8 is a side view schematically showing the structure of the moving body 100. In FIG. 8, two sensors are shown as an example.

In FIG. 8, a footrest 41 on which the passenger 47 puts his/her feet is provided in the moving body 100. Then, the pressure-sensitive sensor 42 is arranged on the footrest 41. The pressure-sensitive sensor 42 detects sole pressure received from soles of the passenger 47. Accordingly, the output of the pressure-sensitive sensor 42 varies depending on the states of the passenger 47. For example, when dismounting, the passenger 47 tries to put his/her feet down on the ground from the footrest 41. Thus, sole pressure is reduced. As such, it can be judged that the passenger dismounts when the sole pressure detected in the pressure-sensitive sensor 42 is equal to or lower than the threshold value.

Further, a shield sensor 43 provided in the footrest 41 may also be used. The shield sensor 43 optically detects that it is covered with the legs of the passenger. The output of the shield sensor 47 varies depending on the states of the passenger. When the receiving surface or the like is covered with the legs of the passenger 47, the shield sensor 43 is ON. It is possible to judge whether the passenger dismounts by arranging the shield sensor 43 at an appropriate place. For example, the passenger moves his/her legs when dismounting. The shield sensor 43 is arranged at a position that can detect the movement of the legs. The location at which the shield sensor 43 is provided is not limited to the footrest 41. It is desirable that the shield sensor 43 is provided at a front side of the moving body 100. In summary, the shield sensor 43 is arranged so that ON/OFF can be switched by dismount operation by the passenger 47. Accordingly, the output varies depending on the states of the passenger. Thus, it is judged whether the passenger dismounts. As a matter of course, it may be judged whether the passenger dismounts by combination of two or more sensors. Otherwise, two or more sensors of the same type may be arranged.

Although the two-wheel type moving body 100 has been described in the above description, the number of wheels is not limited to such examples. The present invention is also applicable to single-wheel type moving bodies or to moving bodies having three or more wheels. Further, although the moving body 100 having the passenger seat 22 is explained in the above description, the moving body 100 may be a moving carriage for transporting objects. Thus, the transportation object may be any one of an inanimate object and a person. The above control can be executed even when the inanimate object is dismounted from the body 12. As a matter of course, the moving body 100 may be other similar moving bodies such as mobile robots. Further, manipulation may be performed by someone other than the passenger. In this case, the moving body may be moved by remote manipulation.

INDUSTRIAL APPLICABILITY

The present invention is applicable to an inverted wheel type moving body and a method of controlling the same.

The invention claimed is:

1. An inverted wheel type moving body that moves in accordance with command input according to manipulation by a manipulator and transports a transportation object, the inverted wheel type moving body comprising:
  a chassis rotationally supporting a wheel;
  a first drive unit rotationally driving the wheel;
  a body provided to mount the transportation object and rotatably supported on the chassis through a support member;
  a sensor provided to judge whether the transportation object dismounts from the body, output of the sensor varying depending on states of the transportation object on the body;
  a second drive unit performing overturn preventing operation; and
  a control unit controlling the first drive unit to reduce velocity of the inverted wheel type moving body upon judgment that the transportation object dismounts based on the output from the sensor when the inverted wheel type moving body travels faster than a certain velocity, wherein
  the control unit controls the second drive unit to perform the overturn preventing operation after an absolute value of velocity of the inverted wheel type moving body is lower than a threshold value when it is judged that the transportation object dismounts, and after the second drive unit performs the overturn preventing operation, the control unit sets drive torque of the wheel to 0 so as to stop the inverted wheel type moving body travelling at a velocity lower than the threshold value.

2. The inverted wheel type moving body according to claim 1, wherein the control unit judges that the transportation object dismounts based on the output from the sensor and the command input and controls the second drive unit to execute the overturn preventing operation when the inverted wheel type moving body travels at or less than the certain velocity.

3. The inverted wheel type moving body according to claim 1, wherein upon judgment that the transportation object dismounts, the inverted wheel type moving body sets a target inclination angle that allows the body to incline in a direction opposite to moving direction, and the control unit feedback controls the first drive unit in accordance with the target inclination angle.

4. The inverted wheel type moving body according to claim 1, wherein upon judgment that the transportation object dismounts, the inverted wheel type moving body sets a torque command that allows the body to incline in a direction opposite to moving direction, and the first drive unit rotationally drives the wheel based on the torque command.

5. The inverted wheel type moving body according to claim 1, wherein the inverted wheel type moving body sets drive torque of the wheel to 0 after starting the overturn preventing operation.

6. The inverted wheel type moving body according to claim 1, wherein the inverted wheel type moving body executes the overturn preventing operation by lowering position of center of mass of the body or deploying an overturn preventing member in a forward side of the body.

7. An inverted wheel type moving body that moves in accordance with command input according to manipulation by a manipulator and transports a transportation object, the inverted wheel type moving body comprising:
- a chassis rotationally supporting a wheel;
- a first drive unit rotationally driving the wheel;
- a body provided to mount the transportation object and rotatably supported on the chassis through a support member;
- a sensor provided to judge whether the transportation object dismounts from the body, output of the sensor varying depending on states of the transportation object on the body;
- a second drive unit performing overturn preventing operation; and
- a control unit judging that the transportation object dismounts based on the output from the sensor and the command input and controlling the second drive unit to execute the overturn preventing operation when the inverted wheel type moving body travels at or less than a certain velocity, the control unit setting drive torque of the wheel to 0 after the second drive unit executes the overturn preventing operation so as to stop the inverted wheel type moving body travelling at a velocity at or lower than the certain velocity.

8. The inverted wheel type moving body according to claim 7, wherein upon judgment that the transportation object dismounts, the inverted wheel type moving body sets a target inclination angle that allows the body to incline in a direction opposite to moving direction, and the control unit feedback controls the first drive unit in accordance with the target inclination angle.

9. The inverted wheel type moving body according to claim 7, wherein upon judgment that the transportation object dismounts, the inverted wheel type moving body sets a torque command that allows the body to incline in a direction opposite to moving direction, and the first drive unit rotationally drives the wheel based on the torque command.

10. The inverted wheel type moving body according to claim 7, wherein the inverted wheel type moving body sets drive torque of the wheel to 0 after starting the overturn preventing operation.

11. A method of controlling an inverted wheel type moving body, the inverted wheel type moving body comprising:
- a chassis rotationally supporting a wheel;
- a first drive unit rotationally driving the wheel;
- a body provided to mount the transportation object and rotatably supported on the chassis through a support member;
- a sensor provided to judge whether the transportation object dismounts from the body, output of the sensor varying depending on states of the transportation object on the body; and
- a second drive unit performing overturn preventing operation, the method comprising:
- a step of judging whether the inverted wheel type moving body travels faster than a certain velocity;
- a step of judging whether the transportation object dismounts based on the output from the sensor when the body travels faster than the certain velocity;
- a step of reducing velocity of the inverted wheel type moving body upon judgment that the transportation object dismounts;
- a step of controlling the second drive unit to execute the overturn preventing operation after an absolute value of velocity of the inverted wheel type moving body is lower than a threshold value; and
- a step of setting drive torque of the wheel to 0 after the second drive unit executes the overturn preventing operation so as to stop the inverted wheel type moving body travelling at a velocity lower than the threshold value.

12. The method of controlling the inverted wheel type moving body according to claim 11, further comprising steps of judging that the transportation object dismounts based on the output from the sensor and the command input and controlling the second drive unit to operate the overturn preventing operation when the inverted wheel type moving body travels at or less than the certain velocity.

13. The method of controlling the inverted wheel type moving body according to claim 11, comprising upon judgment that the transportation object dismounts, setting a target inclination angle that allows the body to incline in a direction opposite to moving direction, and feedback controlling the first drive unit in accordance with the target inclination angle.

14. The method of controlling the inverted wheel type moving body according to claim 11, comprising upon judgment that the transportation object dismounts, setting a torque command that allows the body to incline in a direction opposite to moving direction, and rotationally driving the wheel by the first drive unit based on the torque command.

15. The method of controlling the inverted wheel type moving body according to claim 11, comprising setting drive torque of the wheel to 0 after starting the overturn preventing operation.

16. A method of controlling an inverted wheel type moving body, the inverted wheel type moving body comprising:
- a chassis rotationally supporting a wheel;
- a first drive unit rotationally driving the wheel;
- a body provided to mount the transportation object and rotatably supported on the chassis through a support member;
- a sensor provided to judge whether the transportation object dismounts from the body, output of the sensor varying depending on states of the transportation object on the body; and
- a second drive unit performing overturn preventing operation, the inverted wheel type moving body moving in accordance with command input according to manipulation by a manipulator and transporting a transportation object, the method comprising:
- a step of judging whether the inverted wheel type moving body travels faster than a certain velocity;
- steps of judging that the transportation object dismounts based on the output from the sensor and the command input and controlling the second drive unit to execute the overturn preventing operation when the inverted wheel type moving body travels at or less than the certain velocity; and
- a step of setting drive torque of the wheel to 0 after the second drive unit performs the overturn preventing operation so as to stop the inverted wheel type moving body travelling at a velocity at or lower than the certain velocity.

17. The method of controlling the inverted wheel type moving body according to claim 16, comprising executing the overturn preventing operation by lowering position of center of mass of the body or deploying an overturn preventing member in a forward side of the body.

18. The method of controlling the inverted wheel type moving body according to claim 16, comprising upon judgment that the transportation object dismounts, setting a target inclination angle that allows the body to incline in a direction opposite to moving direction, and feedback controlling the first drive unit in accordance with the target inclination angle.

19. The method of controlling the inverted wheel type moving body according to claim 16, comprising upon judgment that the transportation object dismounts, setting a torque command that allows the body to incline in a direction opposite to moving direction, and rotationally driving the wheel by the first drive unit based on the torque command.

20. The method of controlling the inverted wheel type moving body according to claim 16, comprising setting drive torque of the wheel to 0 after starting the overturn preventing operation.

* * * * *